United States Patent [19]
Gunn

[11] Patent Number: 5,517,190
[45] Date of Patent: May 14, 1996

[54] PHYSICAL MEASUREMENT FROM CHANGES IN REACTANCE

[76] Inventor: Colin N. Gunn, 2771 Vantilburg Crescent, Victoria, British Columbia, Canada, V9B 3K5

[21] Appl. No.: 191,213

[22] Filed: Feb. 3, 1994

[51] Int. Cl.$^6$ ................................................. G08C 19/16
[52] U.S. Cl. ........................... 340/870.18; 340/870.31; 340/870.37; 324/661; 324/662; 33/561
[58] Field of Search ................ 340/870.18, 870.31, 340/870.37, 870.01, 680; 324/661, 662, 681, 682, 691; 33/555, 558, 559, 561, DIG. 15

[56] References Cited

U.S. PATENT DOCUMENTS

| | | | |
|---|---|---|---|
| 3,353,098 | 11/1967 | Foster et al. | 340/870.37 |
| 3,651,506 | 3/1972 | Schmidt | 340/870.37 |
| 3,670,243 | 6/1972 | Fougere et al. | 340/870.31 |
| 3,736,647 | 6/1973 | Roeder et al. | 29/470 |
| 4,118,871 | 10/1978 | Kirkham | 33/174 PC |
| 4,396,322 | 8/1983 | Nomura et al. | 409/134 |
| 4,425,061 | 1/1984 | Kindl et al. | 408/16 |
| 4,473,950 | 10/1984 | Finn et al. | 33/143 L |
| 4,670,989 | 6/1987 | Juengel | 33/558 |
| 4,787,150 | 11/1988 | Klinginsmith, III | 33/552 |
| 4,806,848 | 2/1989 | Demers | 324/61 R |
| 4,814,691 | 3/1989 | Garbini et al. | 324/61 R |
| 4,864,294 | 9/1989 | Fukuhisa | 340/680 |
| 4,881,858 | 11/1989 | Volk et al. | 409/218 |
| 5,121,555 | 6/1992 | Jiorle | 33/642 |
| 5,189,377 | 2/1993 | Rhoades et al. | 324/662 |
| 5,279,042 | 1/1994 | Gonzalez et al. | 33/561 |

FOREIGN PATENT DOCUMENTS 1235213  4/1988  Canada ....................... 342/2

Primary Examiner—John K. Peng
Assistant Examiner—Daniel J. Wu
Attorney, Agent, or Firm—Fetherstonhaugh & Co.

[57] ABSTRACT

An apparatus and method for center finding and physical proximity measurement, the apparatus including a reactance controlled signal source for producing a measurement signal having a measurement signal frequency dependent upon reactance and a probe tip connected to the signal source. The probe tip is operable to receive the measurement signal while presenting a measurement reactance to the signal source, the measurement reactance being due to coupling of the probe tip with a workpiece adjacent the probe tip and the measurement reactance varying in accordance with the physical proximity of the probe tip to the workpiece. The measurement reactance causes the signal source to vary the measurement signal frequency according to the proximity of the probe tip to the workpiece. The measurement signal frequency is sufficiently high to enable the measurement signal to be radiated by the probe tip for reception by a remote receiver. The probe is therefore rotatable and operable to provide continuous proximity information while rotating.

13 Claims, 13 Drawing Sheets

PHYSICAL MEASUREMENT FROM CHANGES IN REACTANCE

BACKGROUND OF THE INVENTION

This invention relates to proximity detection apparatus, centre-finding apparatus, coordinate measuring apparatus, surface levelling apparatus, and thickness measurement apparatus employing changes in reactance responsive to the physical quantity measured.

When a machine such as a lathe or milling machine is to be used to accurately perform a function relative to a position on a workpiece, some reference point on the workpiece must be used to align the machine. When the reference point is the centre of a bore or the centre of a shaft, measurement techniques must be employed to accurately determine the centre's position relative to the machine's coordinate space.

Proximity detection probes can be used to determine the contour of the bore or shaft, however, complex mathematical calculations are often required to calculate the centre and often the result of the calculation is subject to precision limitations. Even if a centre is calculated, there may still remain the problem of aligning a tool holder or other object with the centre, which is further subject to adjustment errors. Effectively, these methods of alignment should be considered "open loop methods" as no feedback is continuously provided during the alignment process.

Proximity detection devices employing changes in capacitance created between a probe tip and a workpiece are known and described in U.S. Pat. No. 5,189,377 to Rhoades et al. Such devices include circuitry which measures capacitance between the probe tip and the workpiece and provide a signal operable to control a numerically controlled machine. The circuitry is typically connected to the machine by wires which limit movement of the device such that it must remain stationary or at least non-rotational relative to the machine.

U.S. Pat. No. 4,670,989 to Juengel discloses a touch probe which transmits a microwave signal modulated by frequency shift keying in response to contact of the probe with an object. Discrete, rather than continuous proximity information is provided by this probe and therefore it is unable to present information relating to the distance of the probe to the workpiece. Such information must be provided in conjunction with other equipment.

Effectively, the Rhoades et al. device is capable of providing continuous positional information however it is tethered to the machine on which it is installed. The Juengel device is not tethered but does not provide continuous proximity information. Neither of these probes can be rotated while at the same time providing continuous proximity information which limits or excludes their use in centre finding applications.

U.S. Pat. No. 4,118,871 to Kirkham discloses a radio frequency touch probe which indicates a workpiece contact condition through changing the radiation characteristics of the probe tip/antenna. A substantial drop in output signal indicates a contact condition. This relies on establishing a low impedance contact, at the transmitted frequency (not DC), between the probe tip/antenna and workpiece. A reliable low impedance contact is not always present due to oxidation and the like. Additionally, the Kirkham device does not provide simultaneous proximity information while probing which results in a "blind" probing system requiring low probing speeds and correction factors to account for probe tip bending and positional overshoot of the machine system.

The patent of Kirkham relies solely on a low impedance contact to effectively "short out" the radiating probe tip to indicate the contact condition. It therefore works by changing the radiation characteristics of the radiator. Also, the Kirkham probe, apart from not providing simultaneous proximity capability with a single probe tip, would not work effectively when the probing operation effectively shields the primary tip radiator, such as would be the case when probing a deep bore. It would be desirable therefore to have a device which can transmit continuous proximity information when rotating or stationary.

SUMMARY OF THE INVENTION

In accordance with one aspect of the invention there is provided an apparatus and method for centre finding and physical proximity measurement, the apparatus including a reactance controlled signal source for producing a measurement signal having a measurement signal frequency dependent upon reactance and a probe tip connected to the signal source. The probe tip is operable to receive the measurement signal while presenting a measurement reactance to the signal source, the measurement reactance being due to coupling of the probe tip with a workpiece adjacent the probe tip and the measurement reactance varying in accordance with the physical proximity of the probe tip to the workpiece. The measurement reactance causes the signal source to vary the measurement signal frequency according to the proximity of the probe tip to the workpiece. The measurement signal frequency is sufficiently high to enable the measurement signal to be radiated by the probe tip for reception by a remote receiver. The probe is therefore rotatable and operable to provide continuous proximity information while rotating.

Preferably, the reactance controlled signal source includes a crystal oscillator circuit including a crystal having parallel and series resonant frequencies and a first reactance cooperating with the measurement reactance, the first reactance causing the oscillator circuit to oscillate at a nominal frequency when the probe tip is far from the workpiece. The oscillator circuit produces the measurement signal having the nominal frequency when the probe tip is far away from the workpiece, the measurement signal being shifted in frequency in a range being between the parallel and series resonant frequencies in response to changes in the measurement reactance.

Preferably, the apparatus includes frequency stabilizing means for stabilizing frequency drift of the measurement signal.

Preferably, the apparatus includes contact sensing means for sensing contact of the probe tip with the workpiece and for disabling the measurement signal from being radiated when the probe tip contacts the workpiece.

Preferably, the apparatus includes a receiver for receiving the radiated measurement signal and for producing a received signal in response thereto.

Preferably, the apparatus includes shielding means for shielding the probe tip from environmental electric fields.

Preferably, the probe tip has a unitary, solid, electrically conducting body having a threaded portion, a radially outwardly flared portion adjacent the threaded portion, and a cylindrical portion adjacent the flared portion, all disposed symmetrically about a common longitudinal probe tip axis.

In accordance with another aspect of the invention there is provided a method of indicating the physical proximity of a probe tip relative to a workpiece, the method comprising the steps of:

a) producing a measurement signal having a measurement signal frequency dependent upon reactance presented to a reactance controlled signal source;

b) receiving the measurement signal at the probe tip while presenting a measurement reactance to the signal source, the measurement reactance being due to coupling of the probe tip with the workpiece, the measurement reactance varying in accordance with the physical proximity of the probe tip to the workpiece, thereby causing the signal source to vary the measurement signal frequency according to the proximity of the probe tip to the workpiece, while radiating the measurement signal for reception by a remotely located receiver.

In accordance with another aspect of the invention, there is provided a method of finding a bore axis of a symmetrical bore in an electrically conductive workpiece, the method comprising the steps of:

a) positioning an electrically conductive probe tip having a rotationally symmetrical portion, such that the symmetrical portion extends partially into the bore;

b) producing a measurement signal having a measurement signal frequency dependent upon reactance presented to a reactance controlled signal source;

c) receiving the measurement signal at the probe tip while presenting a measurement reactance to the signal source due to coupling of the probe tip with the workpiece, the measurement reactance varying in accordance with the physical proximity of the symmetrical portion of the probe tip with the bore axis thereby causing the signal source to vary the signal frequency in accordance with variances in the proximity of the symmetrical portion to the bore axis, while radiating the measurement signal for reception by a remotely located receiver; and d) adjusting the relative position between the probe tip and workpiece until the frequency of the measurement signal is maximized.

In accordance with another aspect of the invention, there is provided a method of finding a bore axis of a circular bore or shaft in an electrically conductive workpiece, the method comprising the steps of:

a) rotating an electrically conductive probe tip having an asymmetrical portion, in a position where the asymmetrical portion extends at least partially into the bore;

b) producing a measurement signal having a measurement signal frequency dependent upon reactance presented to a reactance controlled signal source;

c) receiving the measurement signal at the probe tip while presenting a measurement reactance to the signal source due to coupling of the probe tip with the workpiece, the measurement reactance varying in accordance with the physical proximity of the asymmetrical portion of the probe tip with the workpiece, thereby causing the signal source to vary the signal frequency according to the proximity of the asymmetrical portion of the probe tip to the workpiece, while radiating the measurement signal for reception by a remotely located receiver; and d) adjusting the relative position of the probe tip relative to the workpiece until the variation of the measurement signal frequency is minimized.

In accordance with another aspect of the invention, there is provided a method of perpendicularly aligning a rotational tool axis with a workpiece axis, the method comprising the steps of:

a) rotating an asymmetrical portion of an electrically conductive probe tip about the rotational tool axis, in a plane approximately parallel with the workpiece axis;

b) producing a measurement signal having a measurement signal frequency dependent upon reactance presented to a reactance controlled signal source;

c) receiving the measurement signal at the probe tip while presenting a measurement reactance to the signal source due to coupling of the probe tip with the workpiece, the measurement reactance varying in accordance with the physical proximity of the asymmetrical portion of the probe tip to the workpiece, thereby causing the signal source to vary the signal frequency during each rotation of the probe tip, according to the proximity of the asymmetrical portion of the probe tip to the workpiece, while radiating the measurement signal for reception by a remotely located receiver; and d) adjusting the relative position between the rotational tool axis and the workpiece axis until the variation of the measurement signal frequency is minimized.

In accordance with another aspect of the invention, there is provided a method of determining the surface profile of a conductive workpiece, the method comprising the steps of:

a) producing a measurement signal having a measurement signal frequency dependent upon reactance presented to a reactance controlled signal source;

b) moving a probe tip connected to the reactance controlled signal source into close proximity with the workpiece until the probe tip contacts the workpiece while presenting a measurement capacitance due to capacitive coupling between the probe tip and the workpiece to the reactance controlled signal source, the measurement capacitance increasing with proximity of the probe tip to the workpiece thereby causing the frequency of the measurement signal to decrease as proximity increases;

c) decreasing the rate of movement of the probe tip toward the workpiece as the frequency of the measurement signal decreases such that the velocity of the probe tip toward the workpiece at the time of contact with the workpiece is approximately zero;

d) moving the probe tip away from the workpiece until the measurement signal has a frequency corresponding to a pre-determined reference frequency;

e) moving the probe tip generally parallel to the workpiece surface while moving the probe tip toward or away from the workpiece such that the measurement signal frequency is maintained approximately equal to the predetermined measurement frequency;

f) maintaining a list of three-dimensional coordinates of the probe tip relative to a reference point during movement of the probe tip, the three dimensional coordinates defining the surface profile of the workpiece.

BRIEF DESCRIPTION OF THE DRAWINGS

In drawings which illustrate embodiments of the invention.

DETAILED DESCRIPTION

FIG. 1

Figure 1:
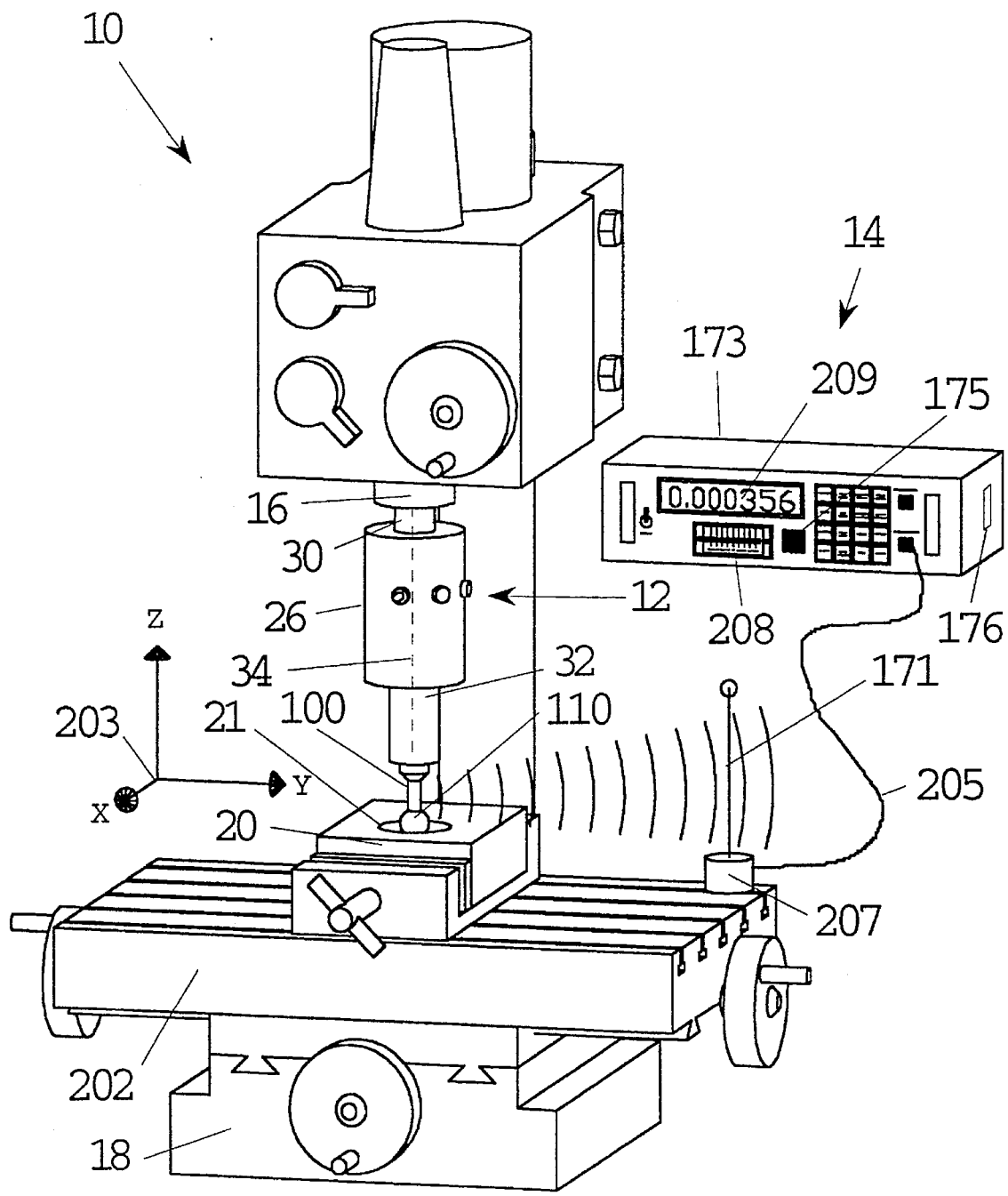
FIG. 1 is an oblique view of a probe apparatus according to a first embodiment of the invention, the apparatus being mounted on a vertical milling machine.

Referring to FIG. 1, an apparatus according to a first embodiment of the invention is shown generally at 10. The apparatus includes a probe shown generally at 12 and a remote receiver shown generally at 14. The probe is shown mounted in a milling machine spindle 16 on a milling machine 18 to which a workpiece 20 is secured.

Figure 2:
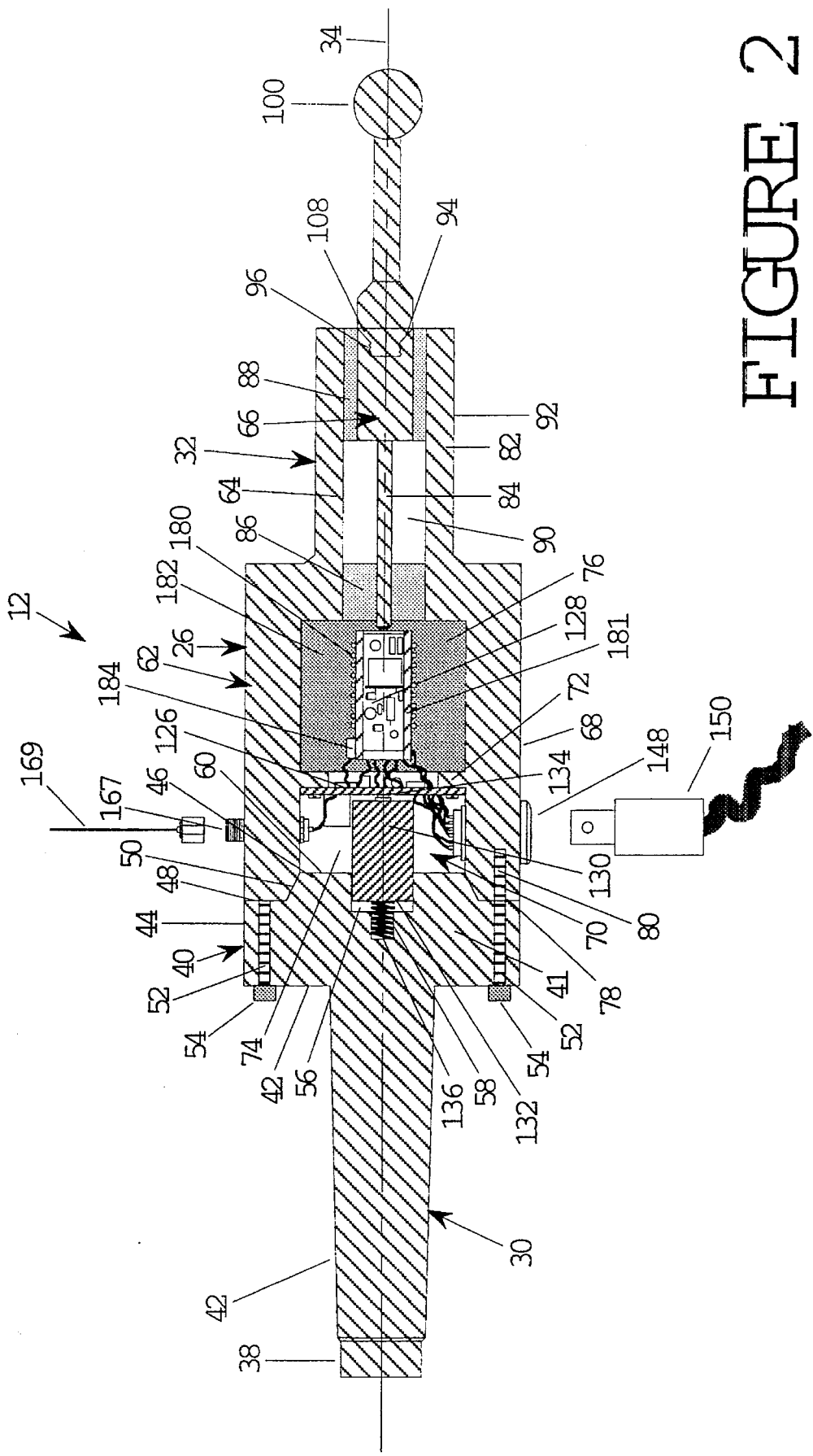
FIG. 2 is a cross sectional view of the probe apparatus shown in FIG. 1.

Referring to FIGS. 1 and 2, the probe 12 has a probe body 26 and a probe tip 100. The probe body 26 is comprised of a probe mounting portion 30, and a probe tip mounting portion 32. The probe mounting portion 30 and probe tip mounting portion 32 are disposed symmetrically about a longitudinal probe axis 34 and are formed from conductive material, preferably steel, in order to minimize dimensional distortions which may occur through normal handling of the probe.

Probe Mounting Portion

FIG. 2

Referring to FIG. 2, the probe mounting portion 30 has first and second end portions 38 and 40 and a tapered portion 42 extending therebetween. The tapered portion is tapered in accordance with the Morris standard taper and is precision machined, hardened and ground to provide accurate fit and alignment in conventional tapered spindle or tool holding apparatus, or various adapters operable to allow mounting to other spindle and tool holding apparatus such as cam lock or threaded spindle types.

The second end portion 40 has a first bulk portion 41 having a circular disk shaped portion 44 and a raised self-centring portion 46. The disc shaped portion has a plurality of axially parallel openings 52 operable to receive respective threaded portions of screws 54 therethrough and has an annular portion 48 terminated by a tapered wall portion 50 of the self centring portion 46.

The self centring portion has a flat annular surface 60, generally extending from the tapered wall portion 50. A first bore 56 having a first relatively large diameter and a second bore 58 having a relatively small diameter, extend coaxially into the flat annular surface 60.

Probe Tip Mounting Portion

The probe tip mounting portion 32 includes a second bulk portion 62, an axial capacitor portion 64, and a probe tip receptacle 66. The second bulk portion 62 has a cylindrical wall portion 68 extending coaxially from the axial capacitor portion 64 to define a compartment space shown generally at 70. A radially inwardly extending annular divider portion 72 divides the compartment space into first and second compartments 74 and 76.

The cylindrical wall portion 68 has an annular end portion 78 having a shape complementary to the annular portion 48 and tapered wall portion 50, which serves to axially align the probe tip mounting portion with the probe mounting portion. The annular end portion further has threaded openings 80 operable to receive complementary threaded portions of the screws 54 to secure the probe mounting portion 30 to the probe tip mounting portion 32 whereby the first compartment 74 is completely enclosed. Other probe mounting portions (not shown) may replace the probe mounting portion 30 described above to provide mounting means for various other conventional mounting systems such as Cam Lock, and Brown and Sharpe tapers. Preferably alternative probe mounting portions have complementary shapes similar to those described above to permit axial alignment of the probe mounting portion and probe tip mounting portion.

The axial capacitor portion 64 includes a cylindrical wall 82 extending axially from the second bulk portion 62. A centre conductor 84 extends coaxially with the cylindrical wall from the second compartment 76 to the probe tip receptacle 66. The centre conductor 84 is supported in place by first and second nylon dielectric plugs 86 and 88 which are disposed between the cylindrical wall 82 and the centre conductor 84. The first and second nylon dielectric plugs are spaced apart axially by an air space 90. The probe tip receptacle 66 is embedded in the second nylon dielectric plug 88 and is coaxial therewith such that access to the probe tip receptacle 66 is permitted from outside the probe 12. The probe tip receptacle is radially encompassed by a distal end portion 92 of the cylindrical wall 82 such that, in general, an electric field between the probe tip receptacle 66 and the cylindrical wall 82 is uniformly oriented in a radial direction. This distal end portion 92 serves to electrically shield the probe tip receptacle 66.

The probe tip receptacle 66 has a radially inwardly flared portion 94 and a threaded portion 96 for receiving a cooperating portion 108 of a probe tip 100. It will be appreciated that the threaded portion 96 permits replacement of probe tips to allow probe tips designed for different uses to be installed in the receptacle.

Probe Tip

FIG. 3

Figure 3:
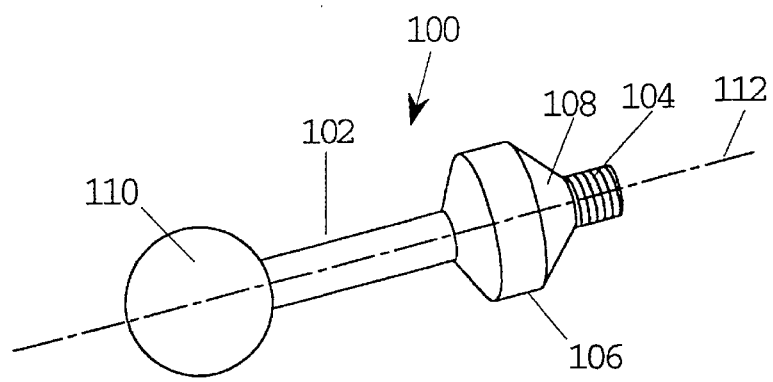
FIG. 3 is an oblique view of a probe tip according to the first embodiment of the invention.

Referring to FIG. 3, a first probe tip according to the first embodiment is shown generally at 100. The first probe tip includes a unitary, solid, electrically conducting body 102 having a threaded portion 104, a radially outwardly flared portion 108, a cylindrical portion 106 and a spherical portion 110, all disposed symmetrically about a common longitudinal probe tip axis 112. The threaded portion 104 cooperates with the threaded portion 96 of the probe tip receptacle 66 shown in FIG. 2 to enable the probe tip to be electrically connected to the receptacle and mechanically secured thereto. The radially outwardly flared portion 108 cooperates with the flared portion 94 of the probe tip receptacle to axially align the probe tip axis 112 with the axis 34 of the probe 12. The flared portion 94 and flared portion 108 cooperate to self-centre the probe tip 100 in axial alignment. Preferably, the probe tip 100 and probe tip receptacle 66 are made to high mechanical accuracy such that the probe tip axis 112 is repeatably alignable with the probe axis 34.

Electric Circuitry

Referring back to FIG. 2, the first compartment 74 is used to hold a first circuit board 126 and the second compartment is used to hold a hollow copper cylinder 181 containing a second circuit board 128. The first circuit board contains circuitry for a voltage regulator circuit for powering a reactance controlled signal source 142 implemented on the second circuit board.

Power Supply

The voltage regulator circuit derives power from a 3.6 volt lithium battery 130 having a negative pole 132 and a positive pole 134. The negative pole 132 is received in the first bore 56 and contacts a conducting spring 136 contained by the second bore 58. The conducting spring electrically connects the negative pole 132 to the probe mounting portion 30.

Therefore the probe mounting portion and the negative pole are at the same electrical potential and devices connected to the probe mounting portion 30 are also at the same electrical potential. Such devices will include the workpiece 20 upon which combined proximity and contact measurements can be made.

The negative pole is further electrically connected to the probe tip mounting portion 32 through the screws 54 in the threaded openings 80. The probe tip mounting portion 32 is therefore at the same electrical potential as the negative pole 132. A connection (not shown) from the probe tip mounting portion 32 to the first circuit board 126 is provided to make the negative pole potential available to components forming the voltage regulator circuit. It will be appreciated that the negative pole potential may be referred to as ground potential, signal ground or just "ground".

The positive pole 134 is operable to electrically connect to a contact (not shown) on the first circuit board 126 and is biased into connection therewith by the force exerted on the negative pole 132 by the spring 136. The positive pole potential is thus provided to the voltage regulator components through the contact.

FIG. 4

Figure 4:
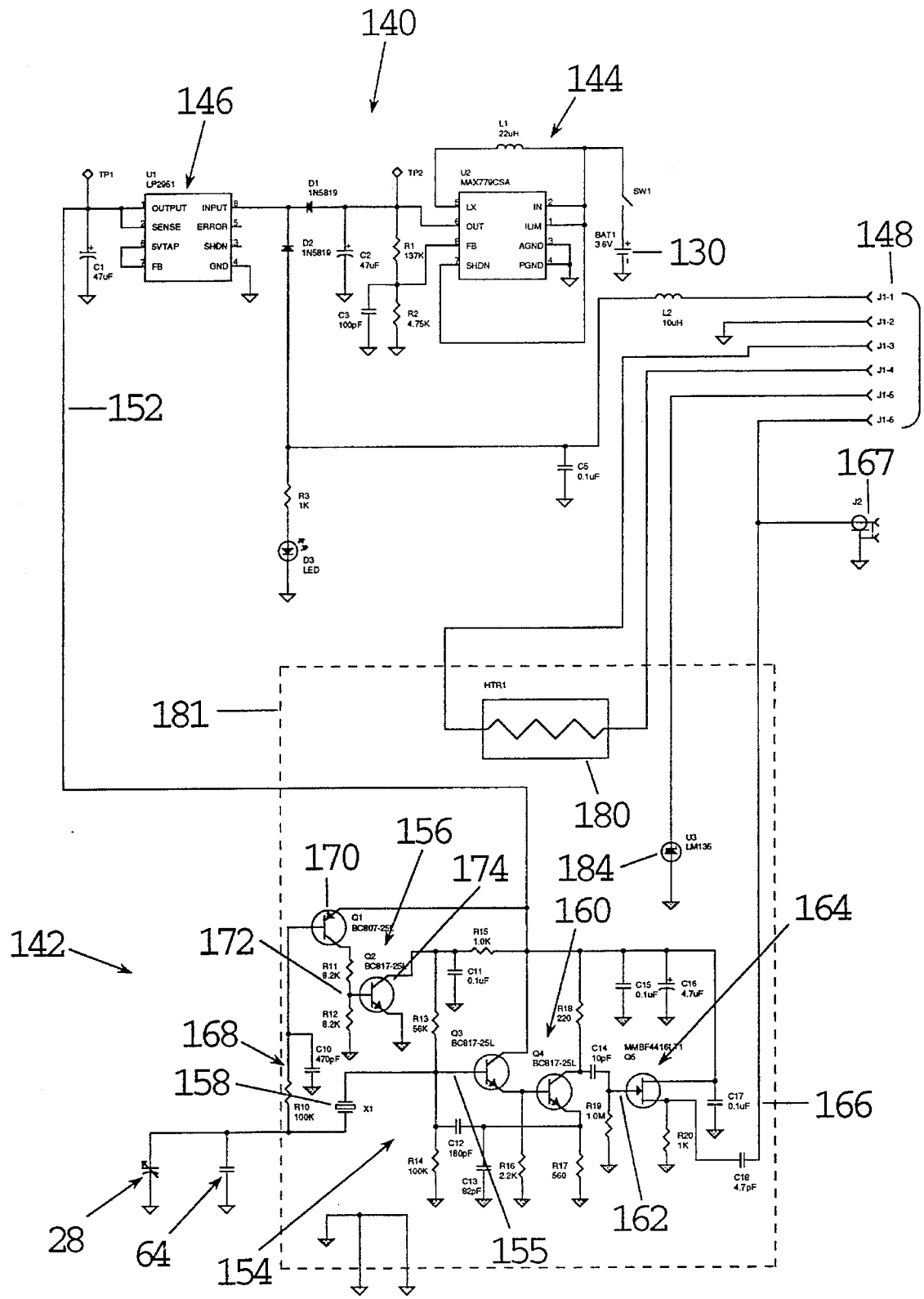
FIG. 4 is a schematic diagram of a reactance controlled signal source according to the first embodiment of the invention.

Referring to FIG. 4, a schematic representation of the voltage regulator circuit is shown generally at 140 and a schematic representation of the reactance controlled signal source is shown generally at 142. The voltage regulator circuit 140 is conventional and includes a DC to DC converter section 144 and a voltage regulator section 146. The DC to DC converter is operable to step up the 3.6 V battery voltage to 6 volts. The output voltage of the voltage regulator section is 5 volts.

A connector 148 is provided to supply power from an external source (not shown) as an alternative to the battery 130. When power is received from the external source, the DC to DC converter section is bypassed and power from the external source is supplied directly to the voltage regulator section 146. Referring back to FIG. 2, the connector 148 for receiving power from an external source is shown mounted on the wall portion 68. A complementary connector 150 is connected to the external source to supply power therefrom. Referring back to FIG. 4, the regulated voltage produced by the regulator section 146 is supplied to the reactance controlled signal source 142 by a first wire 152 and by a second wire (not shown) connected to signal ground.

Reactance Controlled Signal Source

The reactance controlled signal source 142 includes a crystal oscillator circuit 154 and a contact sensing circuit 156. The crystal oscillator circuit 154 is of the Colpitts crystal oscillator type having a capacitive reactance collectively provided by the axial capacitor portion 64 in parallel with the capacitance 28 provided by the probe tip 100, connected in series with a crystal 158. In this embodiment, the crystal is an AT cut 21.4 MHz fundamental mode crystal having a stable frequency pullability of approximately 20 KHz, between the series and parallel crystal resonant frequencies.

The axial capacitor portion 64 is dimensioned to cause the crystal oscillator circuit to operate near its parallel resonant frequency when the probe tip 100 is far away from the workpiece 20. Preferably the axial capacitor portion 64 presents minimum transmission line capacitance between the probe tip and the oscillator circuit in order to maximize the effect of probe tip capacitance variations. In this embodiment, the axial capacitor presents a nominal capacitance of approximately 14 pF when no probe tip is attached. This value of capacitance establishes the upper operating frequency of the oscillator circuit and preferably establishes it as near as possible to the parallel resonant frequency of the crystal. Increasing probe tip capacitance 28, caused by moving the probe tip closer to the workpiece acts to decrease the frequency of oscillation toward the series resonant frequency of the crystal.

Referring back to FIG. 1, it will be appreciated that because the probe 12 is inserted in the milling machine spindle 16, which is metallic, the spindle and hence the machine on which the probe 12 is mounted becomes electrically connected to signal ground. The workpiece 20 will therefore also be electrically connected to signal ground by connection of the workpiece 20 to the machine in which the probe is mounted. The workpiece must be electrically connected to signal ground to cause a reliably defined probe capacitance to be formed between the probe tip 100 and the workpiece 20 when the probe tip is sufficiently near the workpiece. The phrase "reliably defined" is meant to mean that the workpiece capacitance is not influenced by external bodies. If the workpiece 20 is not electrically connected to signal common, a capacitance will still be formed between the probe tip and workpiece since even free space bodies exhibit capacitance. However, if this occurs then the capacitance formed is extremely variable since the workpiece is essentially "floating" and is then influenced by all external bodies, including the users hands, etc. Additionally, contact probing would not work if a DC path to circuit common is not provided, as will be described further below.

Referring to FIGS. 1 and 4, the probe capacitance 28 increases as the probe tip 100 is brought nearer the workpiece 20 until the probe capacitance 28 is sufficient to present a capacitive reactance to the crystal oscillator circuit to shift the frequency of oscillation of the circuit 154 toward the series resonant frequency of the crystal 158. Thus, as the probe is brought nearer the workpiece, the frequency of oscillation of the crystal oscillator circuit 154 is modulated downward from near the parallel resonant frequency toward the series resonant frequency. Similarly, as the probe is withdrawn from the workpiece, the frequency of oscillation is modulated upward toward the parallel resonant frequency.

The oscillator always operates in an essentially parallel resonant mode between the series and parallel resonant frequencies of the crystal. The oscillator circuit 154 thus produces a measurement signal having a frequency determined by the capacitive reactance presented to it.

Since the capacitance presented by the axial capacitor portion 64 and the capacitance 28 presented by the probe tip 100 and workpiece 20 are connected directly to the crystal 158, the measurement signal driving the crystal 158 is also presented to the axial capacitor portion 64 and probe tip 100. Since the measurement signal driving the crystal 158 is on the order of 21.4 MHz to place the crystal oscillator circuit in parallel resonant oscillation, this same measurement signal is presented to the probe tip. The amplitude of this measurement signal is on the order of 1.0 volt RMS which is sufficient to cause it to be radiated and hence, transmitted to a receiving antenna 171 located in close proximity (approximately 3 feet) to the probe tip. Hence a radiated signal is produced.

Since the frequency of oscillation is shifted according to proximity of the probe to the workpiece, the measurement signal appearing at the probe tip 100 is similarly shifted hence, the radiated signal is also shifted according to proximity of the probe tip to the workpiece. Thus, the time varying capacitive reactance produced by time varying the physical proximity between the probe tip and the workpiece imparts a time varying modulation to the measurement signal.

Thus, referring to FIG. 1, information regarding the proximity of the probe tip to the workpiece is conveyed to the remote receiver 14 by the amount of modulation in the radiated signal. The probe tip 100 thus performs the dual purpose of proximity detector and transmitting antenna. Effectively a crystal element is used together with the probe tip capacitance to cause a narrow band frequency shift between the series and parallel resonant frequencies of the particular crystal used. This effectively produces a frequency modulated measurement signal of low occupied signal bandwidth allowing reliable operation in electrically noisy industrial environments.

Referring back to FIG. 4, the crystal 158 is connected to an oscillator amplifier shown generally at 160 having an output 162 for producing a replica of the measurement signal. The output 162 is connected to a buffer amplifier 164 which has an output 166 operable to provide a buffered version of the measurement signal at the connector 148 and at an antenna connector 167. Referring to FIG. 2, the antenna connector 167 is secured to the wall portion 68 and is operable to supply the buffered version of the measurement signal to an antenna 169 operable to transmit the measurement signal to the remotely located receiving antenna 171 in FIG. 1, the antenna 171 being connected to a receiver 173. Referring back to FIG. 2, the antenna 169 is optional and need only be used where a stronger radiated signal than that provided by the probe tip 28 alone is required for adequate reception of the radiated signal. The buffer amplifier 164 effectively isolates the oscillator from undesired proximity capacitive loading acting on the external antenna 169 and acts as output means for providing an output signal corresponding to the measurement signal.

Contact Sensing Circuit

Referring back to FIG. 4, the reactance controlled signal source 142 further includes a contact sensing circuit 156 including a lowpass filter 168 connected to a sensing transistor 170 connected by a resistor divider 172 to a switching transistor 174 operable to remove the operating bias from the oscillator transistors 160. The lowpass filter 168 is operable to filter out the high frequency 21.4 MHz signal appearing at the probe tip 100 while providing a direct current path from the sensing transistor 170 to signal ground when the probe tip 100 is placed in electrical contact with the workpiece (20). A high dc current gain, provided by transistors 170 and 174, provides reliable contact sensing even with relatively high probe tip/workpiece contact impedance. The sensing transistor 170 is operable to supply current to the resistor divider 172 when the probe is in electrical contact with the workpiece, thereby activating the switching transistor 174 causing the removal of oscillator transistor base bias at 155. When such condition occurs, the oscillator circuit is effectively disabled and no measurement signal is produced at the probe tip 100, hence no signal is radiated by the probe tip 100. In addition, the disabled oscillator eliminates the measurement signal replica from buffer amplifier 164 output. Loss of the radiated signal in this manner can be interpreted by the receiver as indicating contact of the probe tip 100 with the workpiece 20. In effect, the disabling of the measurement signal is a form of continuous wave on-off keyed modulation which represents the contact/no contact condition. This is useful for limiting the probe tip position and for establishing a contact reference point which may be used in conjunction with proximity probing. Contact and proximity sensing capability is therefore combined using a single probe tip 100.

It will be apparent that without the contact sensing circuit 156 the crystal 158 would effectively be connected to signal common and the measurement signal disabled simply by connecting the probe tip 28 to the workpiece (20). However, the connection of the probe to the workpiece cannot be relied upon for a good, low resistance short circuit, due to the possibility of resistance due to oxidation on the surface of the workpiece and due to any other resistances which may be presented. The contact sensing circuit 156 therefore ensures the measurement signal is properly disabled, even in the presence of oxidation resistances and the like. The contact sensing circuitry, by virtue of the high dc current gain (amplification) of cascaded transistors 174 and 170 reliably acts to remove oscillator bias even with a relatively high dc impedance probe tip/workpiece contact. Also, the dc contact sensing circuitry is needed when the secondary antenna is being used in conjunction with contact probing. Without it, the secondary radiated signal would still be produced since the oscillator would still be operating when the probe tip is shorted. The DC contact sensing circuitry therefore acts as contact sensing means for sensing contact of the probe tip with the workpiece and for disabling the measurement signal from being radiated when the probe tip contacts the workpiece.

Temperature Stability

Referring to FIG. 2, it will be appreciated that the measurement signal produced and radiated by the probe tip 100 is influenced by changes in reactance presented by dimensional changes due to temperature effects on the axial capacitor portion 64, the probe tip 100, the crystal 158, and oscillator circuitry 160. Preferably the crystal 158 is stable with respect to temperature such as provided by the AT cut crystal. A temperature stable crystal reduces modulation of the measurement signal due to temperature drift effects caused by variations in temperature acting on the crystal and oscillator circuitry. To reduce the rate of temperature change acting on the second circuit board 128 populated with the reactance controlled signal source 142, thermal insulation 182 such as fibreglass batting is placed in the second compartment 76 to surround the hollow copper cylinder 181. Temperature effects are further reduced in the axial capacitor portion 64 and the probe tip 28 by making these components rather massive such that the time rate of heat transfer to these components is long compared to the time required to take a proximity measurement.

Referring to FIGS. 2 and 4, in this embodiment, temperature drift effects are further reduced by the inclusion of a Nichrome wire resistive heating element 180 wrapped around and in thermal contact with the hollow copper cylinder 181 containing the second circuit board 128. The hollow copper cylinder 181 thus acts as an oven in which the entire second circuit board 128 and hence the reactance controlled signal source 142 is contained in the oven. Furthermore, the first and second bulk portions 41 and 62 act as relatively large heat sinks having large heat capacities which limit the rate of temperature rise in the second compartment 76 and thereby contribute to maintaining the temperature of the second compartment and reactance controlled signal source at a reasonably constant desired temperature.

Power for the heating element 180 is supplied from an external source (not shown) through the connector 148 operable to provide a proportionally controlled pulse width modulated heating signal. A temperature sensor 184 is mounted in low thermal resistance thermal contact with the hollow copper cylinder 181 inside the second compartment 76 and is operable to supply to the external source powering the heating element signals representing the temperature of the hollow copper cylinder 181. By monitoring the temperature of the hollow copper cylinder 181, the external source can proportionally adjust the power supplied to the heating element 180 to maintain the temperature within close tolerances of a pre-determined value which in this embodiment is 60° C.

Operation

Referring to FIG. 1, use of the apparatus is explained as follows. The probe mounting portion 30 is received in the spindle 16 of a milling machine 18. The probe axis 34 is automatically aligned with the spindle axis (not shown) by its taper. The probe tip axis 112 (FIG. 3) is also in alignment with the probe axis 34. The workpiece 20, having a circular bore 21 is secured to the milling machine bed portion 202 in a conventional manner. It will be appreciated that the milling machine bed portion 202, and therefore the workpiece 20 attached thereto is able to be accurately positioned in the X and Y planes as indicated by the coordinate axes 203. The spindle 16 containing the probe 12 may be moved along the z axis toward or away from the workpiece 20. The probe 12 and consequently the probe tip 100 is therefore able to be positioned at any three axis coordinate position relative to the workpiece 20 within the operable machine working space.

When the probe 12 is in a position such that the probe tip 100 is relatively far away from the workpiece 20, the capacitance formed between the probe tip 100 and the workpiece 20 is small. Referring to FIG. 4, under these conditions, the probe capacitance 28 is small and the frequency of oscillation is primarily determined by the axial capacitor portion 64 to be near the parallel resonant frequency of the crystal 158.

Referring back to FIG. 1, as the probe 12 is moved closer to the workpiece 20, the probe tip 100 becomes nearer the workpiece 20 and the capacitance created between the probe tip 100 and the workpiece 20 begins to take effect.

Referring back to FIG. 4, as the probe tip capacitance 28 increases, the reactance of the probe tip capacitance and the fixed reactance of the axial capacitor portion 64 combine additively to produce a total reactance which is presented to the crystal 158. As the probe tip 100 is brought nearer the workpiece 20, the total reactance presented to the crystal 158 decreases thereby shifting the frequency of the measurement signal downward toward the series resonant frequency of the crystal 158. Thus, the frequency or the measurement signal decreases as the probe tip 100 is brought nearer the workpiece and increases as the probe tip 100 is moved away from the workpiece. Hence the frequency of the measurement signal as radiated by the probe tip 100 represents the proximity of the probe tip 100 to the workpiece 20.

Referring to FIG. 4, when the probe tip 100 (shown as probe tip capacitance 28 in FIG. 4) is brought sufficiently near the workpiece to make electrical contact therewith, a small DC current (approximately 40 uA) flows through the sensing transistor 170 which turns on the switching transistor 174 causing the operating bias at 155, presented to the oscillator transistors 160, to be removed which disables oscillation and therefore radiation of the measurement signal is abruptly cut off. This abrupt cut off of the measurement signal provides an indication of contact of the probe tip 100 with the workpiece 20.

Referring back to FIG. 1, the receiving antenna 171 is located approximately 2 ft away from the probe tip 100 and is operable to receive the radiated measurement signal. A length of coaxial cable 205 connects the receiving antenna 171 to the receiver 173. Preferably, the antenna has a magnetic mounting base 207 which enables it to be readily secured to any ferromagnetic structure such as the steel of which the milling machine is made.

Figure 4A:
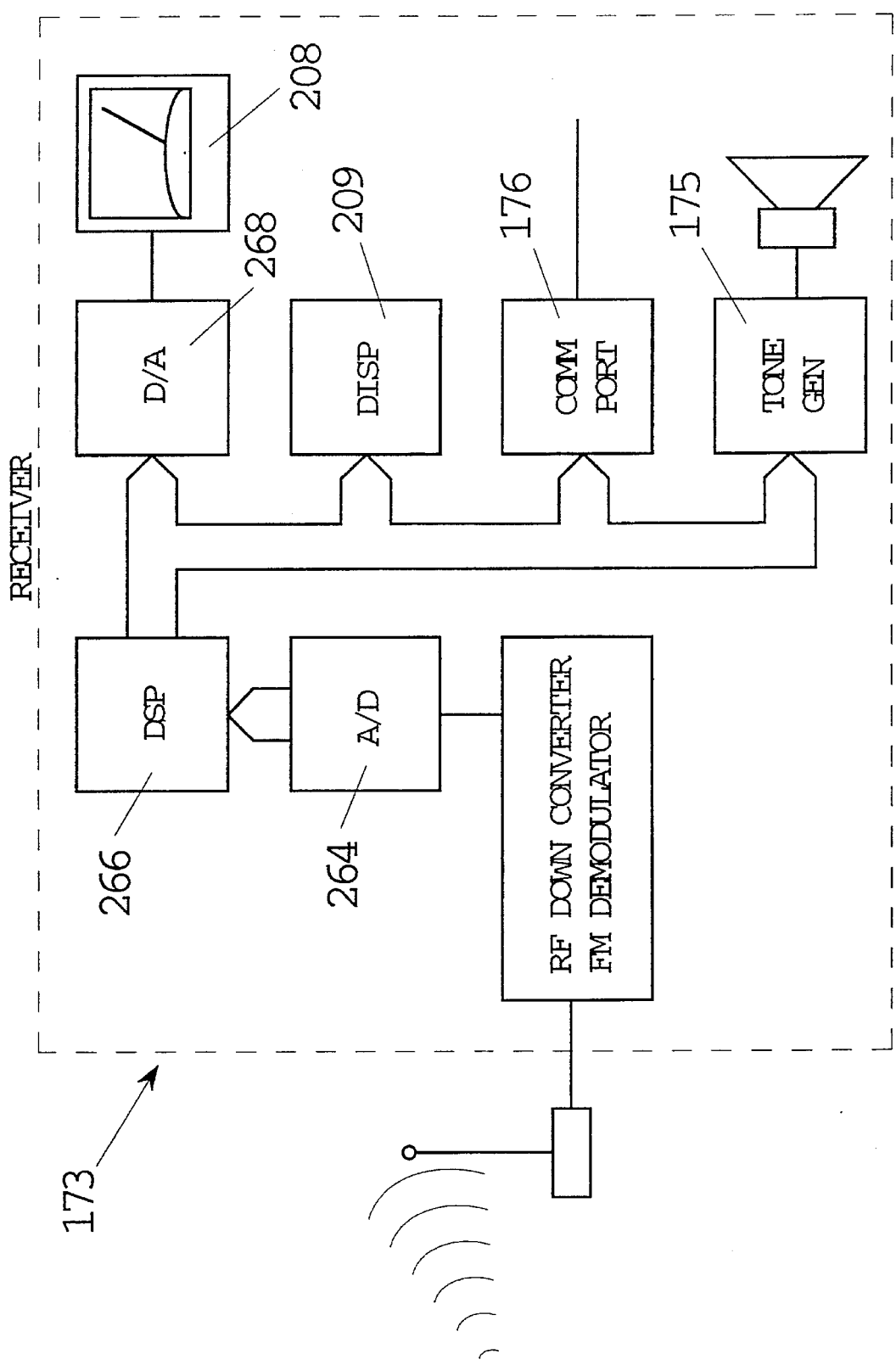
FIG. 4a is a block diagram of a receiver according to the first embodiment of the invention.

Referring to FIG. 4a, the receiver 173 includes a high resolution analog to digital converter 264 which converts a demodulated version of the received signal into a digital signal. The digital signal is supplied to a digital signal processor 266 which functions to extract proximity and physical contact information. A digital to analog converter 268 is driven by the digital signal processor 266 and is used to drive an analog meter movement 208 in accordance with algorithms executed by the digital signal processor. A digital display device 209 is connected to the digital signal processor for displaying additional proximity position information and receiver operating status as determined by said algorithms. An audio circuit including an audible tone generator 175 is further connected to the digital signal processor fix providing an audible indication of probe tip to workpiece contact. The receiver 173 further includes a communications port 176 for providing digital signals relating to the proximity of the probe tip to the workpiece and contact of the probe with the workpiece to remotely located equipment such as positioning equipment or numerically controlled machines, etc allowing automated probing operations.

Preferably, the receiver is highly stable with regard to frequency drift and is operable to resolve small changes in received measurement signal frequency.

The algorithms executed by the digital signal processor include a signal processing algorithm which rectifies and filters the digital signal to produce an essentially direct current signal having a voltage proportional to the peak frequency deviation in the measured signal. In addition, the digital signal processor executes an auto-ranging peak detection algorithm for providing an automatically ranged signal indicative of the peak deviation in the received signal. It will be appreciated that many effects such as filtering or RPM indication from the modulated signal may be incorporated into the digital signal processor algorithms using conventional digital signal processing techniques.

Determining the Surface Profile of a Workpiece

As an extension to the basic task of determining the proximity of the probe tip to the workpiece, the contour or surface profile of the workpiece may also be determined. This is accomplished by moving the probe tip into close proximity with the workpiece until it contacts the workpiece while presenting a measurement capacitance due to capacitive coupling between the probe tip and the workpiece to the reactance controlled signal source. The measurement capacitance will increase with proximity of the probe tip to the workpiece thereby causing the frequency of the measurement signal to decrease as proximity increases. As the frequency of the measurement signal decreases, the rate of movement of the probe tip toward the workpiece is decreased such that the velocity of the probe tip at the time of contact with the workpiece is approximately zero. The coordinates of this position of the probe are then recorded and the probe tip is moved away from the workpiece until the measurement signal has a frequency corresponding to a pre-determined reference frequency. This establishes a reference distance or separation between the probe tip and the workpiece. The probe tip is then moved generally parallel and toward or away from the workpiece surface, about the surface such that the measurement signal frequency is maintained approximately equal to the pre-determined measurement frequency. A list is maintained of three-dimensional coordinates of the probe tip relative to a reference point during movement of the probe tip, the three dimensional coordinates defining the surface profile of the workpiece.

This procedure may be automated by providing the measurement signal to a controller for automatically controlling movement of the probe tip.

Finding the Centre of a Bore with a Non-rotational Probe

Referring to FIG. 1, a typical operating sequence of the first embodiment is now described. The objective is to find the precise centre of the bore 21 and to determine the bore diameter. The probe tip 100 is roughly positioned over the bore 21 through X and Y coordinate adjustment of the milling machine bed portion 202. The probe Z coordinate position is adjusted such that the spherical end portion 110 of the probe tip 100 is lowered into the bore 21 while leaving the body portion of the probe tip 100 free to radiate the measurement signal to the antenna 171.

The X and Y coordinate position of the workpiece 20 is then carefully adjusted to maximize the peak frequency of the radiated measurement signal as displayed by the receiver 173. This corresponds to maximum probe tip to workpiece reactance (minimum capacitance) and occurs in the geometric centre of the cylindrical bore 21. The same centre finding principle may also be applied to other bore shapes, such as hexagonal, square, etc. The main requirement is that the bore be symmetrical about the axis of interest and that the probe tip 100 be dimensioned generally to accommodate the bore size. A probe tip relatively closely matching the size of the bore, maximizes the centring accuracy by maximizing the change in capacitance about the centre position where the capacitive "null" point occurs. The centre finding method described above is enhanced by the fact that the reactance controlled signal source 142 (FIG. 4) employs a crystal oscillator offering high short and long term frequency stability.

Diameter Measuring With a Non-rotating Probe

Referring back to FIG. 1, the apparatus may also be used to find the diameter of the cylindrical bore 21 by moving the workpiece 20 position from the previously determined centre position, in a known and measurable direction, by the machine dials or digital position encoders in the case of a numerically controlled type, until the receiver 173 detects a sudden loss of radiated signal brought on by electrical contact with the cylindrical bore 21 wall. Accuracy of measurement is primarily limited to that of the machine dials or position encoders. Probe tip bending and wear during the contact probing event may be minimized by utilizing the dual functionality of proximity and contact detection offered by the probe. Proximity probing methods generally follow an inverse relationship; sensitivity varies as the inverse of the distance between the probe tip and the workpiece. Effectively, the closer the probe tip is to a surface, the more rapid the change in frequency. By monitoring the time rate of change (d/dt) of the measurement frequency, a prediction of the relative proximity of the probe tip to workpiece distance may be made. In this way, the relative probe tip to workpiece velocity may be reduced in "anticipation" of contacting a surface of the workpiece. The ability to "see" the workpiece in this manner reduces probe tip bending and wear and allows for generally increased probing speed in contact probing operations.

Alternatives

In the first and following embodiments, the Figures show manually operated vertical spindle milling machines used in conjunction with the probe 12. The same principles of operation may be applied to a variety of industrial machines including, for example; lathes, jig borers, multi-axis machining centres, and Coordinate Measuring Machines (CMM). In addition, referring to FIG. 4a, the digital inter/ace port 176 on the receiver 173, provides for automated numerically controlled operation. The digital interface port 176 provides proximity and contact data to the machine control hardware and software.

FIG. 5

Figure 6:
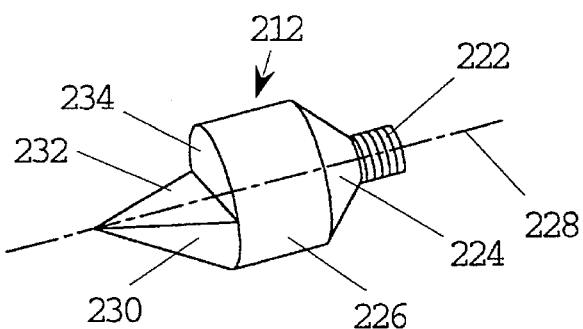
FIG. 6 is an oblique view of a probe tip according to the second embodiment of the invention and appears on the sheet containing FIG. 3.
Figure 5:
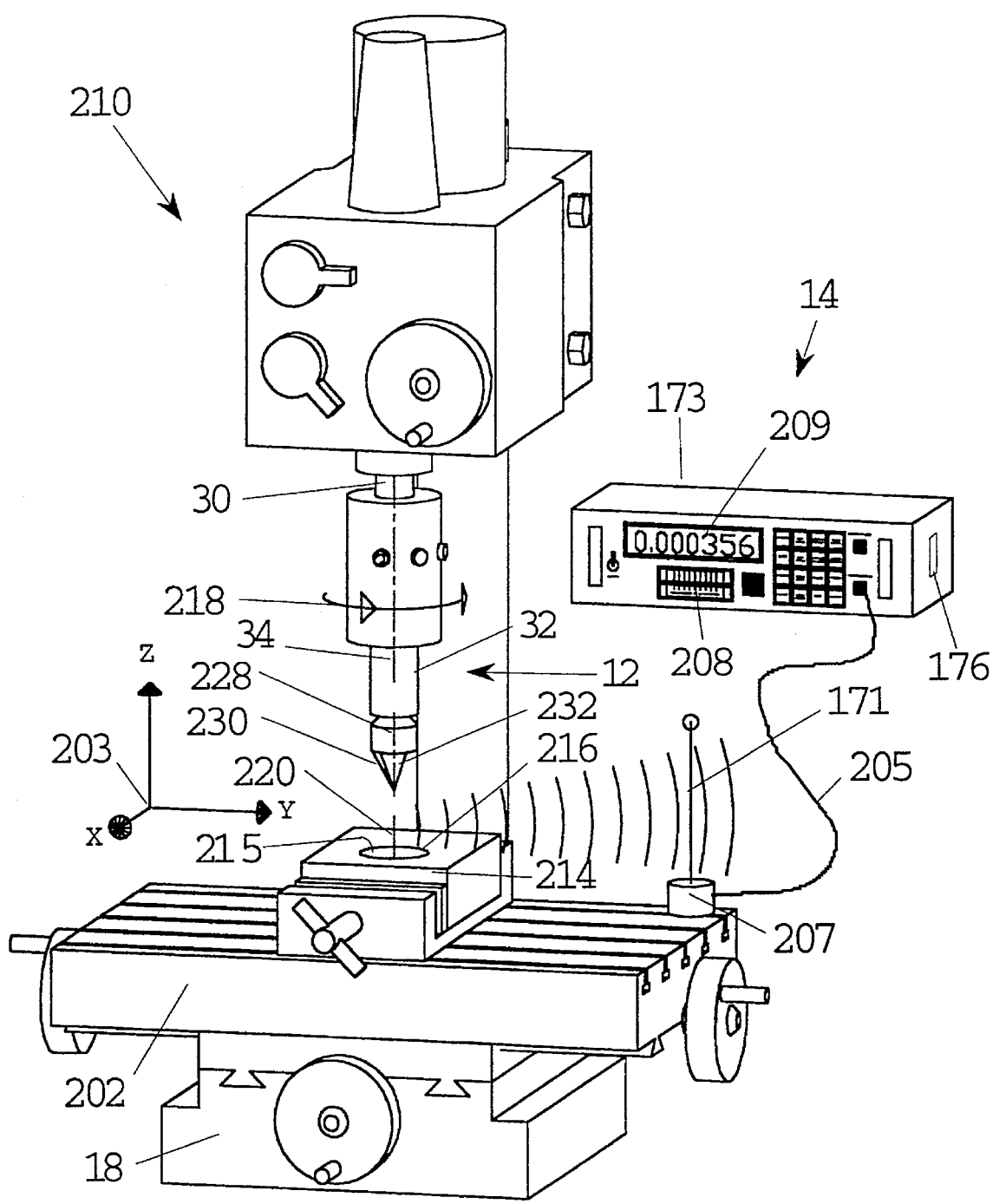
FIG. 5 is an oblique view of a probe apparatus according to a second embodiment of the invention, for finding the centre of a bore, the apparatus being mounted on a vertical milling machine.

Referring to FIG. 5, an apparatus according to a second embodiment of the invention is shown generally at 210. The apparatus includes a milling machine 18 similar to the milling machine described with respect to FIG. 1 and includes a probe 12 similar to the probe described with respect to FIG. 1 with the exception of a different probe tip 212 as shown in FIG. 6. Mounted to the milling machine is a workpiece 214 having a bore 216. In this embodiment, the probe 12 is rotated, by the milling machine spindle drive mechanism, in a direction indicated by arrow 218 while the workpiece 214 is held fixed. One purpose of the embodiment shown in FIG. 5 is to permit alignment of the axis 34 with the bore axis 220.

FIG. 6

Referring to FIG. 6, the probe tip 212 is shown in greater detail. The probe tip 212 is generally similar to the probe tip shown at 100 in FIG. 3 in that it includes a threaded portion 222, a flared portion 224, a cylindrical portion 226 and an axis 228. The probe tip differs however, in that it includes a half conical portion 230 having a triangular shaped face 232 disposed in a plane coincident with the axis 228 and has a semicircular shaped surface 234 disposed in a plane at right angles to the axis 228. The probe tip 212 is thus asymmetrical about the axis 228.

Axis Alignment With a Rotating Probe

Referring back to FIG. 5, a typical operating sequence for aligning the axis 34 with the axis 220 begins by adjusting the z axis elevation of the probe 12 such that the probe tip 212 conical portion extends into close proximity of the bore 216. The axis 34 of the probe 12 will be coincident with the axis 228 of the probe tip 212 by virtue of the connection between the probe tip receptacle and the probe tip 212. If the axis 34 is not coincident with the bore axis 220, the half conical portion 230 will be closer to a particular point 215 on the inside wall of the bore 216 at a particular rotational orientation and will be distant from that point when the probe is at a rotational orientation 180 degrees from the above mentioned orientation.

The probe tip is then rotated such that during each revolution of the probe 12, the half conical portion is moved toward, away and toward any given point on the wall of the bore 216. This variance in spatial separation between the half conical portion and the point 215 creates a changing capacitance between the probe tip and the bore and causes a corresponding modulation of the frequency of the measurement signal. The depth of modulation is determined by the minimum distance between the half conical portion 230 and the inside wall of the bore 216 while the frequency of modulation is equal to the angular velocity at which the probe 12 is rotated.

The probe tip 212 radiates the modulated measurement signal which is received by the antenna 171 and passed to the receiver 173 via the coaxial cable 205. The received measurement signal is down converted, demodulated, sampled and digitized in real time. The digital signal processor in the receiver executes a signal processing algorithm which rectifies and filters the demodulated measurement signal. An auto-ranging peak detection algorithm drives the analog meter movement 208 through a digital to analog (D/A) converter (268 of FIG. 4a). By observing the analog meter movement 208, the user will observe the modulation effect as a direct reading on the analog meter movement 208. The reading provides a direct reading of peak frequency deviation or depth of modulation. A peak detection signal processing algorithm executed by the digital signal processor removes any waving effect from the analog display.

The maximum RPM of the probe is primarily limited by its physical internal structure, and depends upon the mechanical stability of the components inside the probe. Using standard, conventional components the probe as described has been safely rotated up to 500 RPM. The upper limit of probe RPM is also established by the receiver software/hardware, particularly the real time digitization of the modulated measurement signal. In the embodiment described the receiver samples at 15 Hz, which provides a maximum theoretical modulation recovery frequency of 7.5 Hz (as defined by Nyquist), which translates into a probe rotational limit of 450 RPM. The low sampling rate permits a very high analog to digital converter resolution to be employed at low cost. The upper limit is also affected by the finite pullability/bandwidth of the crystal. Modulation up to 4–5 KHz is easily possible which is most probably well beyond what would be mechanically possible.

The user can adjust the X and Y coordinate position 203 of the workpiece 214 while observing the analog meter movement 208, until the modulation effect, displayed as peak frequency deviation, is eliminated. When no discernible modulation is contained in the measurement signal, no change in capacitance is detected and the distance between the half conical portion 230 and any part on the inside wall of the bore 216 must be constant over a full revolution of the probe 12 indicating the axes 34 and 220 are in alignment. The conical end portion 230 is insertable into bores of various diameters, thereby enabling this single probe tip to be used to locate the centre of a wide range of bores. Increasing the cone angle would essentially allow more of the probe tip to enter a given bore size before running into the upper portion of the conical tip, assuming the bore diameter is smaller than the probe tip diameter. This would have the effect of increasing the change of capacitance since capacitance varies inversely with separation distance and therefore would increase sensitivity about the centre position. An increased cone angle would limit the size range of bores to be probed, but as mentioned previously, generally increase sensitivity. When centre finding, a primary objective is to maximize the change in capacitance when the relative workpiece to probe tip position is changed. The conical probe tip allows the operator/computer to initially "home in" on a centre position from a fixed distance and then, as a second and final step, position the probe tip conical portion as close as possible but without physically touching the bore edge. Fine adjustments can then be made at maximum sensitivity, since the probe tip and workpiece will be in very close proximity.

The receiver 173 is also operable, through digital signal processing means, to display the frequency of the recovered modulation as angular velocity in Hertz or revolutions per minute (RPM). In this way, a useful measurement of spindle RPM is possible. Measurement of angular velocity (RPM) requires modulation of the measurement signal, which in the case of the second embodiment, would require an offset from any aligned centre position.

Shaft Axis Alignment

Figure 8:
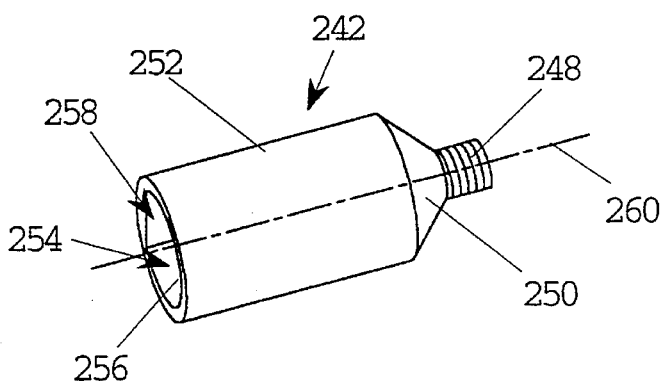
FIG. 8 is an oblique view of a probe tip according to the third embodiment of the invention and appears on the sheet containing FIG. 3.
Figure 7:
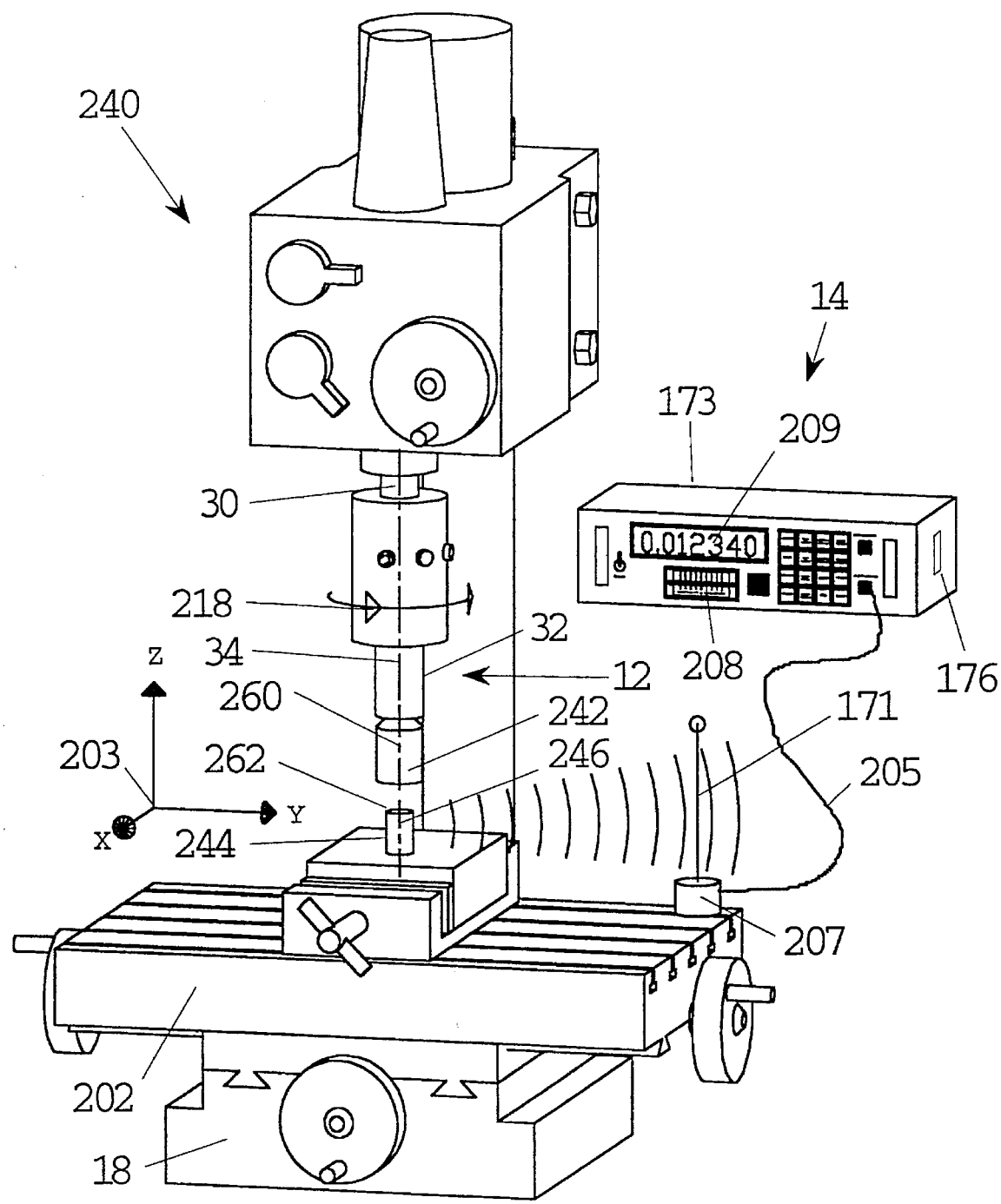
FIG. 7 is an oblique view of a probe apparatus according to a third embodiment of the invention, for finding the centre of a shaft, the apparatus being mounted on a vertical milling machine.

FIGS. 7 and 8

Figure 8A:
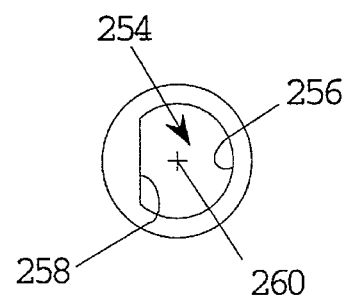

Referring to FIG. 7, a third embodiment of the invention is shown generally at 240. Generally, the apparatus is similar to that shown in FIG. 5 with the exception of a different probe tip 242 and different workpiece 244. In this embodiment, the workpiece 244 has an axis 246 which is to be aligned with axis 34 of the probe 12. The probe tip 242 for this purpose is shown in FIGS. 8 and 8a and includes a threaded portion 248, a flared portion 250, a cylindrical portion 252 and a non-symmetrical bore shown generally at 254. The non-symmetrical portion has a partially circular wall portion 256 and a flat wall portion 258. It will be appreciated that the partially circular wall portion 256 is disposed at a first, constant distance from a rotational axis 260 of the probe tip, whereas the flat wall portion 258 is disposed in a plane parallel to the rotational axis 260 and at a second distance therefrom. It will be apparent that the flat wall portion 258 is closer to the axis 260 than the partially circular wall portion 256.

Referring back to FIG. 7, a distal end portion 262 of the workpiece 244 is inserted into the non-symmetric bore (254 not shown in FIG. 7) of the probe tip 242. If the axis 246 is not aligned with the rotational axis 260, the flat portion 258 seen in FIG. 8 becomes alternately nearer and farther away from any given point on the distal end portion 262 during one rotation of the probe 12. This causes the capacitance between the probe tip 242 and the workpiece 244 to vary in a periodic manner and consequently the measurement signal is modulated. The modulation in the measurement signal is detected by the receiver 173 and appropriately shown on the analog meter movement 208 through digital signal processing techniques as described in the second embodiment. The axes 246 and 260 can be aligned as described above by observing the analog display and adjusting the relative workpiece X and Y coordinate position 203 until the presence of modulation components as displayed on the analog display are eliminated.

Surface Alignment

Figure 9:
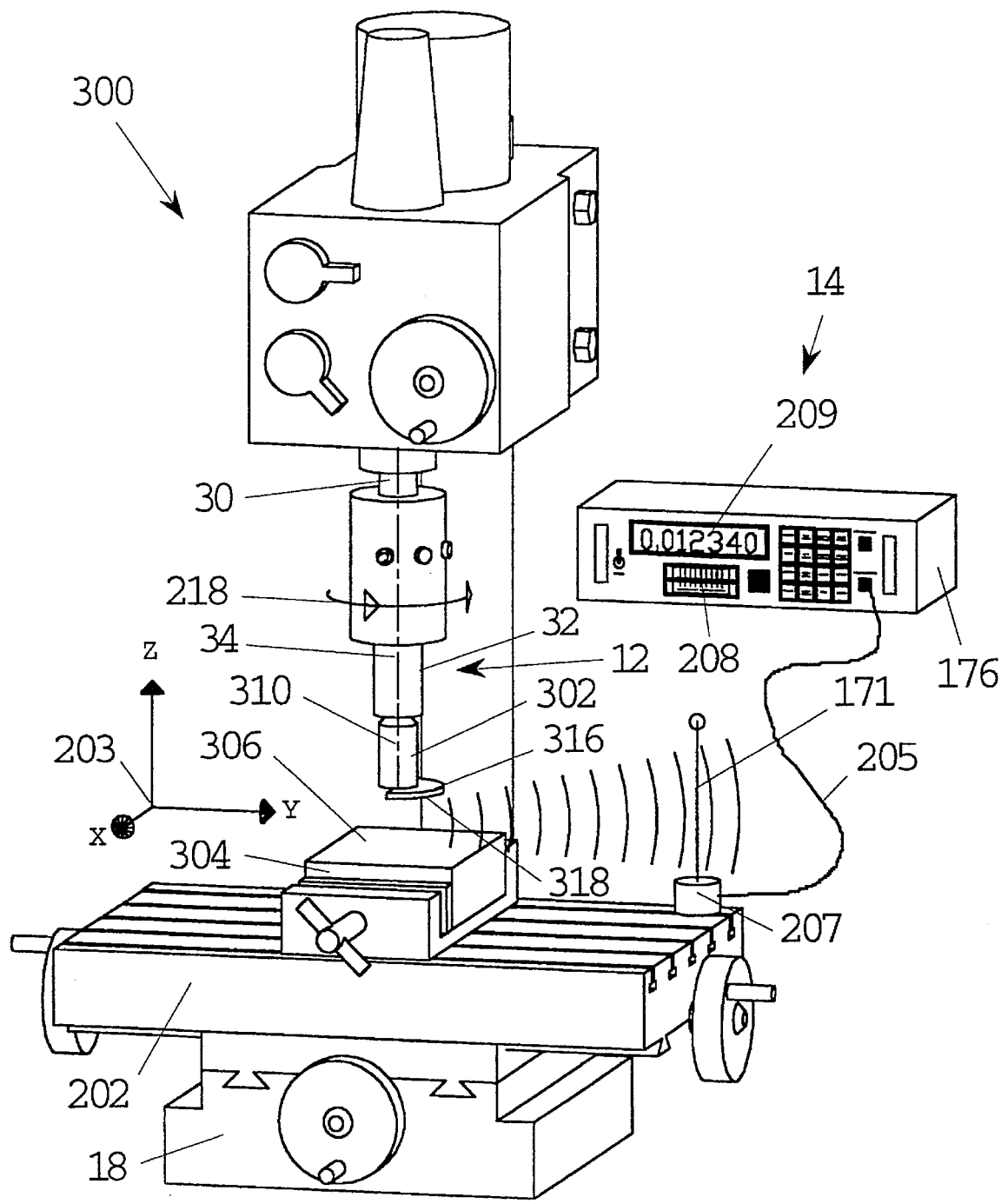
FIG. 9 is an oblique view of a probe apparatus according to a fourth embodiment of the invention, for levelling a flat workpiece surface, the apparatus being mounted on a vertical milling machine.
Figure 10:
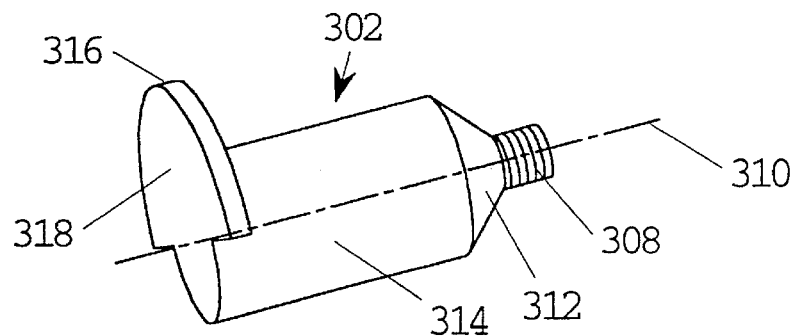
FIG. 10 is an oblique view of a probe tip according to the fourth embodiment of the invention, for surface probing and levelling.

FIGS. 9 and 10

Referring to FIG. 9, a fourth embodiment of the invention is shown generally at 300. Generally, the apparatus is similar to that shown in FIG. 7 with the exception of a different probe tip 302, and different workpiece 304. In this embodiment, the workpiece 304 has a flat top surface 306 which is to be aligned with axis 34 of the probe 12 such that the plane described by the flat top surface 306 is perpendicular to the axis 34. This is essentially a method of precision surface levelling and would normally be performed prior to a surface machining operation. The probe tip 302 for this purpose is shown in FIG. 10 and includes a threaded portion 308, a flared portion 312, a cylindrical portion 314 and a non-symmetrical semi-circular disk portion shown generally at 316. The non-symmetrical semi circular disk portion has a flat surface 318 disposed in a plane perpendicular to the probe tip axis 310.

Referring back to FIG. 9, in this embodiment, the probe 12 is rotated in a direction indicated by arrow 218 while the workpiece 304 is held fixed. The Z axis 203 probe elevation is adjusted such that the non-symmetrical semi-circular disk portion 316 is brought in close proximity with the workpiece flat top surface 306. If the plane described by the flat top surface 306 is not perpendicular to the axis 34, then the flat surface portion 318 of the probe tip becomes alternately nearer and farther away from the flat top surface 306 during one rotation of the probe 12. This, of course, causes the capacitance between the probe tip 302 and the workpiece 304 to vary in a periodic manner and consequently the measurement signal is modulated. The modulation in the measurement signal is detected by the receiver 173 and appropriately shown on the analog meter movement 208 through digital signal processing techniques as previously described in the second, and third embodiments. The perpendicular axis to the plane described by the flat top surface 306, and the probe axis 34 can be aligned as described above by observing the analog display and adjusting the workpiece mounting position until the presence of modulation components as displayed on the analog display are eliminated. In this way, the flat top surface 306 is levelled prior to a machining operation.

The second, third, and fourth embodiments of FIGS. 5–10 provide positional proximity information through modulation of the measurement signal due to rotation of the probe 12 combined with the selection of an appropriate probe tip. It is also possible to achieve similar functionality by rotating the workpiece while the probe 12 is held in a fixed position. An example would include a metal lathe where the workpiece is commonly rotated about a spindle axis, with the probe 12 being fixed in a stationary position mounted to the lathe tailstock.

Additional Probe Tips

FIG. 11

Figure 11:
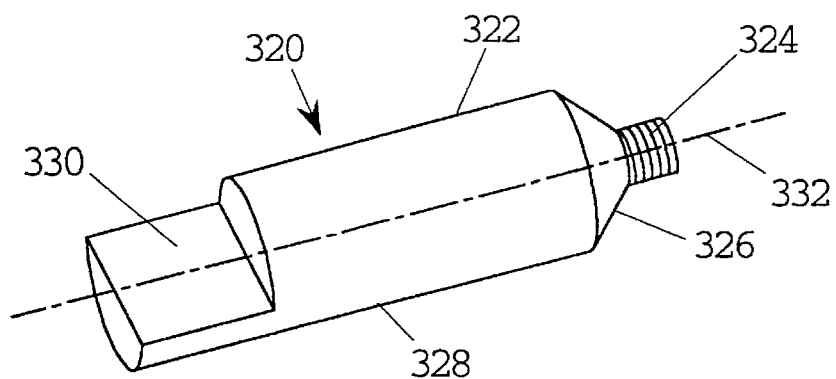
FIG. 11 is an oblique view of a probe tip according to a fifth embodiment of the invention; for internal bore probing.

Referring to FIG. 11, a probe tip according to a fifth embodiment is shown generally at 320. The probe tip includes a unitary, solid, electrically conducting body 322 having a threaded portion 324, a radially outwardly flared portion 326, a cylindrical portion 328 and a flat, planar portion 330, all disposed about a common longitudinal probe tip axis 332. The threaded portion 324 cooperates with the threaded portion 96 of the probe tip receptacle 66 shown in FIG. 2 to enable the probe tip to be electrically connected to the receptacle and mechanically secured thereto. The radially outwardly flared portion 326 cooperates with the flared portion 94 of the probe tip receptacle to axially align the probe tip axis 332 with the axis 34 of the probe 12. The flared portion 94 and flared portion 326 cooperate to self-centre the probe tip 320 in axial alignment. The probe tip 320 is useful for centre finding by the method described in the second embodiment (FIG. 5). The longer cylindrical portion 328, relative to other probe tips, allows complete coverage of the planar portion 330 in bores of significant depth. Any remaining exposed length of the cylindrical portion 328, not disposed in the bore is operable to radiate the measurement signal. During rotation, the planar portion 330 creates a time varying capacitance at the probe tip and hence the measurement signal is modulating while the cylindrical portion 328 (also rotating), due to its continuous symmetry about the axis 332, has no effect on modulation.

Figure 12:
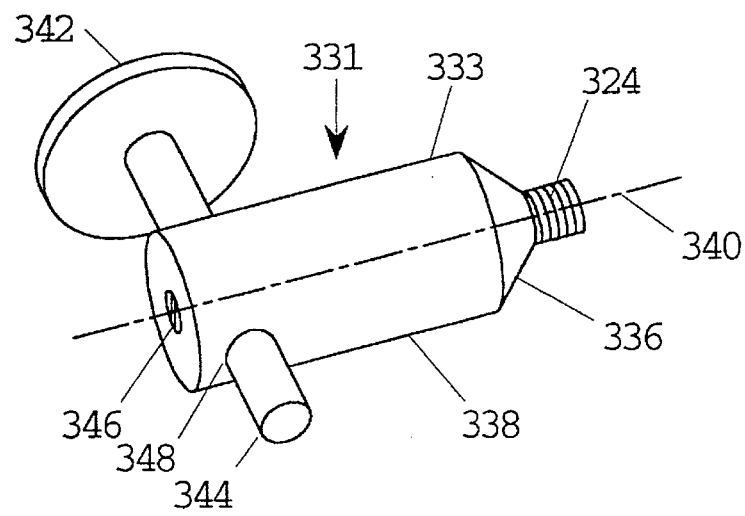
FIG. 12 is an oblique view of a probe tip according to a sixth embodiment of the invention, for internal bore probing, the probe tip having an adjustable member to accommodate a wide range of bore diameters.
Figure 13:
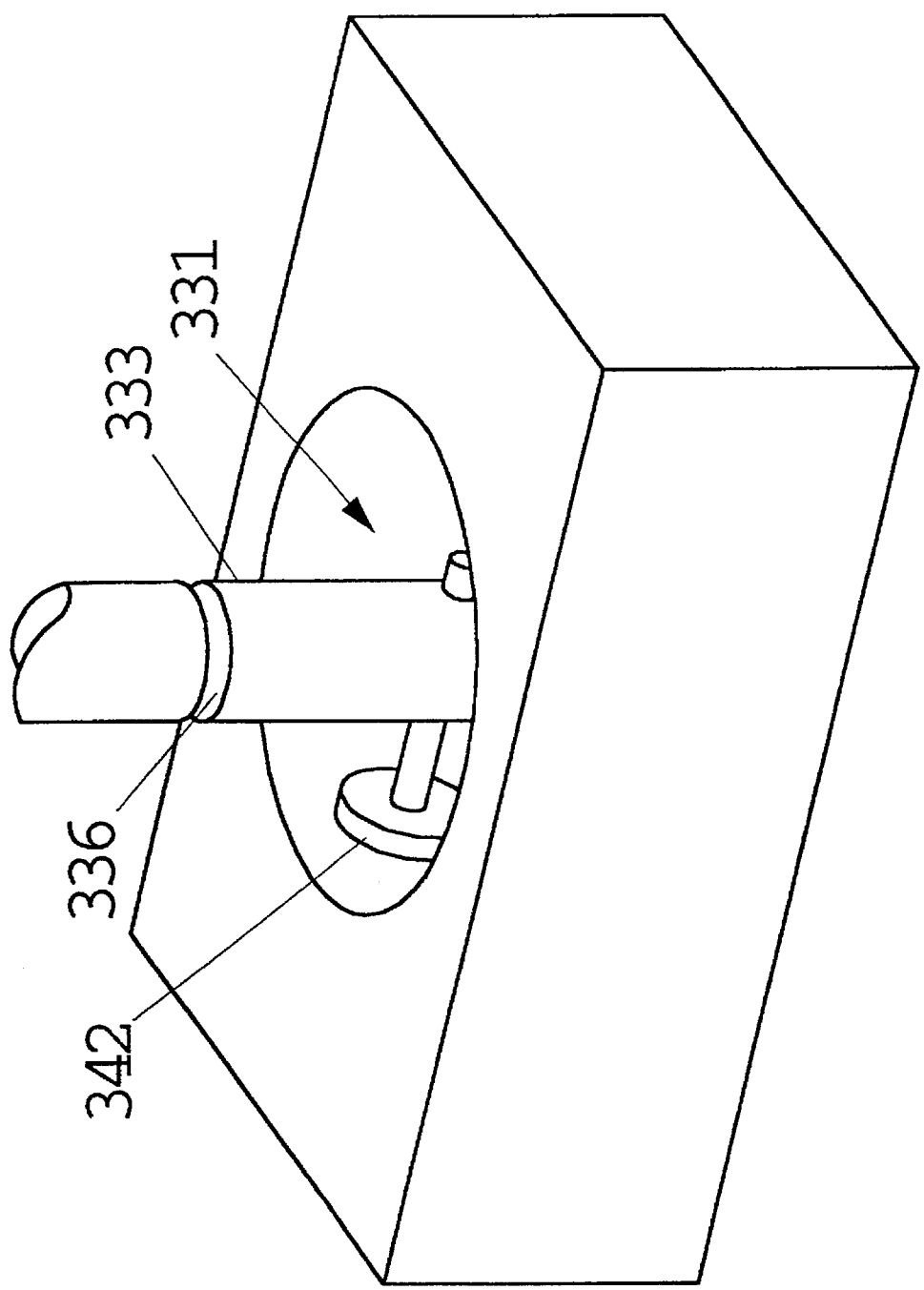
FIG. 13 is an oblique view of a probe tip according to the sixth embodiment shown in a bore of relatively large diameter.

FIGS. 12 and 13

Referring to FIG. 12, a probe tip according to a sixth embodiment of the invention is shown generally at 331. The probe tip includes a unitary, solid, electrically conducting body 333 having a threaded portion 334, a radially outwardly flared portion 336, and a cylindrical portion 338, all disposed about a common longitudinal probe tip axis 340. The cylindrical portion 338 has a diametrically extending bore 348 in which a rod member 344 is received. A cylindrical disk 342 is fixed to a distal end portion of the rod member 344. The rod member is operable to move radially in the bore 348 and can be fixed in position by a set screw 346.

The threaded portion 334 of the probe tip cooperates with the threaded portion 96 of the probe tip receptacle 66 shown in FIG. 2 to enable the probe tip to be electrically connected to the receptacle and mechanically secured thereto. The radially outwardly flared portion 336 cooperates with the flared portion 94 of the probe tip receptacle to axially align the probe tip axis 340 with the axis 34 of the probe 12. The flared portion 94 and flared portion 336 cooperate to self-centre the probe tip 331 in axial alignment. Referring to FIG. 13, the radial position of the cylindrical disk 342, is adjusted to be in close proximity with a wall (not shown) defining a bore being probed. It will be appreciated that when the axis 340 is not in alignment with the axis of the bore distance between the circular disk 342 and the bore wall, the distance between the disk and the wall creates a varying capacitance which produces modulation in the measurement signal. The probe tip 331 is therefore useful for centre finding by a method similar to that described with respect to the second embodiment.

FIG. 14

Figure 14:
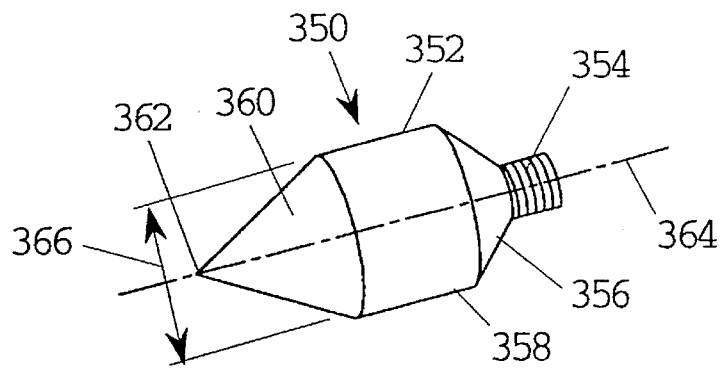
FIG. 14 is an oblique view of a probe tip according to an eighth embodiment of the invention, for bore centre finding in non rotational modes, the probe including a conical tip insertable into bores of various diameters.

Referring to FIG. 14, a probe tip according to a seventh embodiment of the invention is shown generally at 350. The probe tip includes a unitary, solid, electrically conducting body 352 having a threaded portion 354, a radially outwardly flared portion 356, a cylindrical portion 358, and a conical portion 360 having an apex 362, all disposed symmetrically about a common longitudinal probe tip axis 364. The threaded portion 354 cooperates with the threaded portion 96 of the probe tip receptacle 66 shown in FIG. 2 to enable the probe tip to be electrically connected to the receptacle and mechanically secured thereto. The radially outwardly flared portion 356 cooperates with the flared portion 94 of the probe tip receptacle to axially align the probe tip axis 364 with the axis 34 of the probe 12. The flared portion 94 and flared portion 356 cooperate to self-centre the probe tip 350 in axial alignment. The conical portion 360 has a maximum diameter 366 and is insertable into bores of various diameters, thereby enabling this single probe tip to be used to locate the centre of a wide range of bores by a method similar to that described with respect to the first embodiment. (FIG. 1, non rotational.) The conical portion 360 has an angular taper of approximately 60 degrees, measured relative to the probe tip axis, and is effective for determining the centres of bores ranging from a fraction of the maximum diameter of the conical portion 360 to the maximum diameter thereof.

FIG. 15

Figure 15:
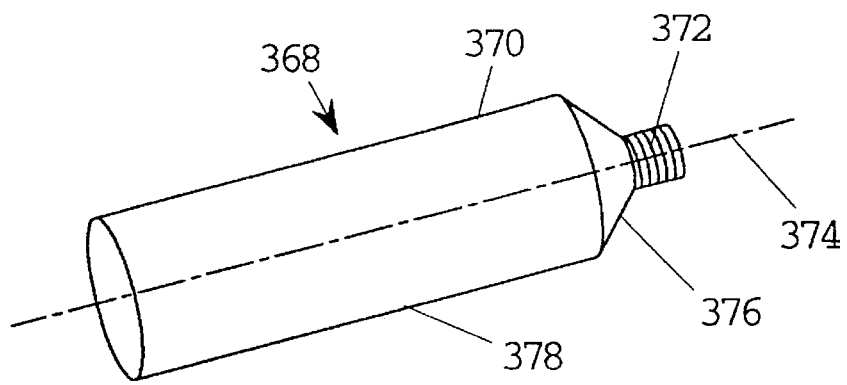
FIG. 15 is an oblique view of a probe tip according to a ninth embodiment of the invention, for bore centre finding, the probe tip including a long cylindrical body operable to probe bores of significant depth.

Referring to FIG. 15, a probe tip according to an eighth embodiment is shown generally at 368. The probe tip includes a unitary, solid, electrically conducting body 370 having a threaded portion 372, a radially outwardly flared portion 376, and a cylindrical portion 378, all disposed symmetrically about a common longitudinal probe tip axis 374. The threaded portion 372 cooperates with the threaded portion 96 of the probe tip receptacle 66 shown in FIG. 2 to enable the probe tip to be electrically connected to the receptacle and mechanically secured thereto. The radially outwardly flared portion 376 cooperates with the flared portion 94 of the probe tip receptacle to axially align the probe tip axis 374 with the axis 34 of the probe 12. The flared portion 94 and flared portion 376 cooperate to self-centre the probe tip 368 in axial alignment. The probe tip 368 is useful for centre finding by the method described with respect to the first embodiment (FIG. 1) (non rotational). The longer length of the probe tip 368, relative to other probe tips, allows for greater probing depth in a particular bore, which increases the probe tip to workpiece capacitance variation and sensitivity about the bore centre axis position.

FIG. 16

Figure 16:
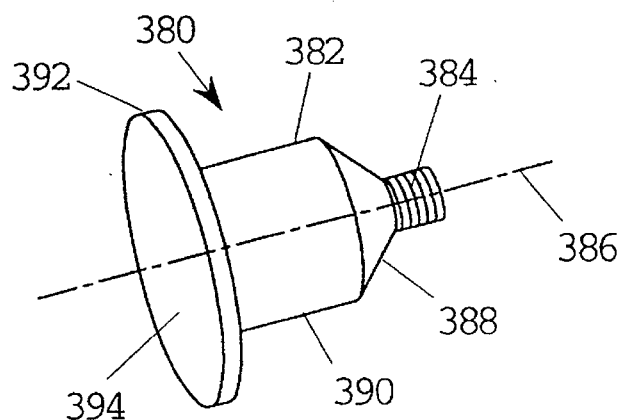
FIG. 16 is an oblique view of a probe tip according to a tenth embodiment of the invention, for surface proximity probing.

Referring to FIG. 16, a probe tip according to a ninth embodiment is shown generally at 380. The probe tip includes a unitary, solid, electrically conducting body 382 having a threaded portion 384, a radially outwardly flared portion 388, a cylindrical portion 390, and a cylindrical disk portion 392, all disposed symmetrically about a common longitudinal probe tip axis 386. The cylindrical disk portion 392 has a planar surface portion 394 disposed perpendicularly and radially to the probe tip axis 386. The threaded portion 384 cooperates with the threaded portion 96 of the probe tip receptacle 66 shown in FIG. 2 to enable the probe tip to be electrically connected to the receptacle and mechanically secured thereto. The radially outwardly flared portion 388 cooperates with the flared portion 94 of the probe tip receptacle to axially align the probe tip axis 386 with the axis 34 of the probe 12. The flared portion 94 and flared portion 388 cooperate to self-centre the probe tip 380 in axial alignment. The probe tip 380 is useful for surface proximity probing, particularly for workpiece alignment and levelling applications.

FIG. 17

Figure 17:
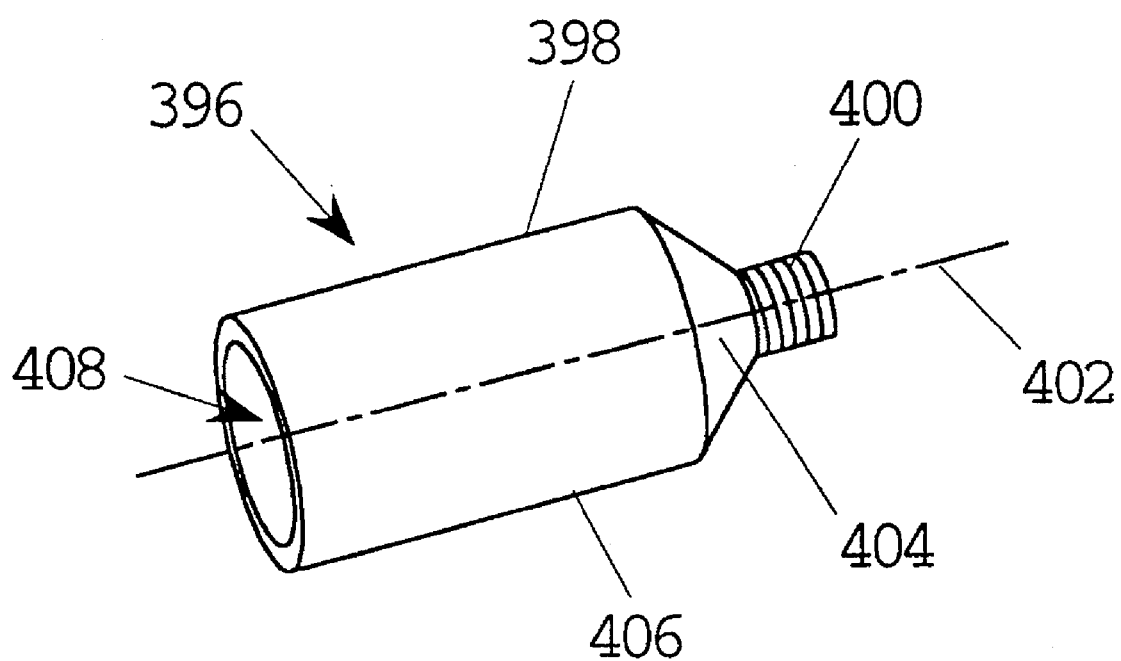
FIG. 17 is an oblique view of a probe tip according to an eleventh embodiment of the invention for shaft centring purposes.

Referring to FIG. 17, a probe tip according to a tenth embodiment is shown generally at 396. The probe tip includes a unitary, solid, electrically conducting body 398 having a threaded portion 400, a radially outwardly flared portion 404, a cylindrical portion 406, and a symmetrical bore portion shown generally at 408, all disposed symmetrically about a common longitudinal probe tip axis 402.

The threaded portion 400 cooperates with the threaded portion 96 of the probe tip receptacle 66 shown in FIG. 2 to enable the probe tip to be electrically connected to the receptacle and mechanically secured thereto. The radially outwardly flared portion 404 cooperates with the flared portion 94 of the probe tip receptacle to axially align the probe tip axis 402 with the axis 34 of the probe 12. The flared portion 94 and flared portion 404 cooperate to self-centre the probe tip 380 in axial alignment. The probe tip 396 is useful for shaft centring applications following the operating procedures similar to those described with respect to the first embodiment (FIG. 1) (non rotational).

Thickness Measurement

The apparatus can be used to accurately measure material thickness of conductive and non-conductive materials by placing such materials to be measured between a probe tip such as shown in FIG. 16 and a conductive ground plane surface. The ground plane surface must be electrically connected to the signal ground of the power supply, preferably through the probe mounting portion 30. The object being measured acts to change the capacitance between the probe tip and conductive ground plane surface and hence creates a change in capacitive reactance sufficient to shift the frequency of oscillation. The high stability offered by the reactance controlled signal source allows repeatable material thickness measurement of high sensitivity and stability.

Non-conductive materials act to change capacitance between the probe tip and conductive surface through their relative dielectric constants which must differ from the dielectric constant of air ie., 1. This may be useful for measuring the thickness of paper streaming off a pulp mill paper machine, without physical contact with the paper. Another application could include statistical process control where a sample material is placed between the probe tip and conductive ground plane surface and compared to a reference standard.

Crystals

While the above embodiments have been described employing a 21.4 MHz crystal, crystals having other frequencies may be employed. It will be appreciated however, that crystals having a higher operating frequency will cause the oscillator circuit to be more sensitive to changes in probe capacitance and hence the probe will be more susceptible to noise effects such as dimensional variations due to thermal expansion due to ambient temperature changes of the probe housing and the like. Alternatively, the oscillator circuit may be operated to produce a signal rich in harmonics of the fundamental frequency of the crystal thereby achieving greater sensitivity using the same crystal. The receiver is tuned to a particular harmonic of the measurement signal. For example, a frequency change of 1 milliHertz at the fundamental frequency would translate into a change of 2 milliHertz at the second harmonic, 3 mHz at the third, etc. The order N of any particular harmonic translates into N times the frequency shift (sensitivity) of the radiated harmonic. Instability of oscillation is, however, increased at harmonics of the fundamental mode frequency.

Higher frequencies may be achieved by operating the crystal in an overtone vibrational mode. Operation at the third, fifth, seventh, ninth, or even eleventh overtone is possible by suppressing the fundamental and other overtone modes through the addition of tuned circuit elements to the oscillator circuitry. Crystal frequency pullability, does however decrease with increasing overtone operation.

Crystals of other cuts may also be employed. Doubly rotated crystals, such as the conventional SC, and FC cuts may be used to improve frequency-temperature stability when used with the internal temperature stabilized (oven) reactance controlled signal source.

Shield

FIG. 18

Figure 18:
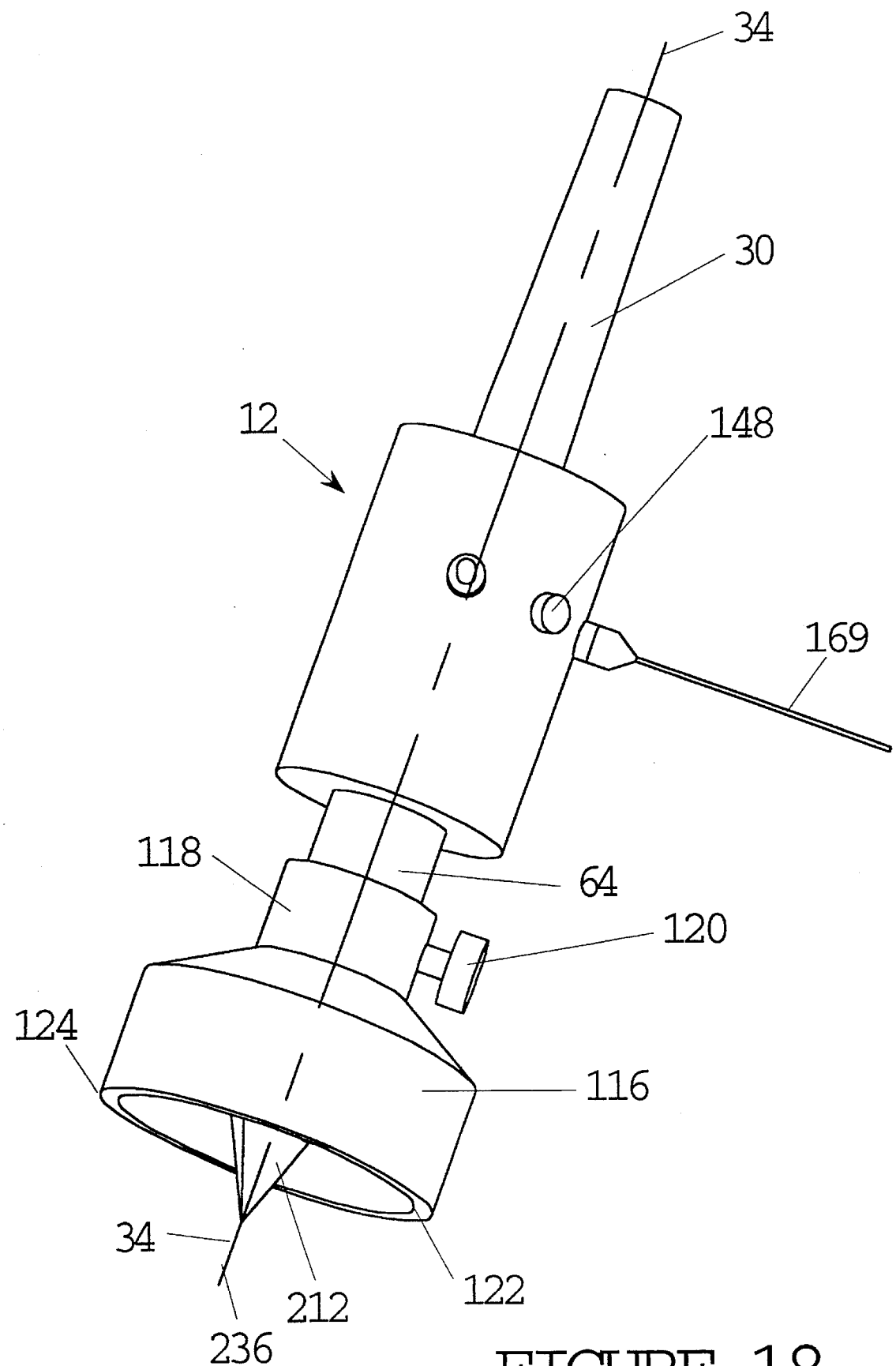
FIG. 18 is an oblique view of a probe apparatus according to a seventh embodiment of the invention, the probe including a probe tip shield and a secondary radiating antenna.

Referring to FIG. 18, a probe tip shield according to an eleventh embodiment is shown generally at 116 for shielding the probe tip from environmental electric fields. The probe tip shield is secured to the distal end portion of the axial capacitor portion 64. The probe tip shield 116 has an axis of symmetry 236 and a connecting portion 118 operable to surround and make electrical connection with the axial capacitor portion and mechanically securable to the distal end portion 92 (shown in FIG. 2) by a set screw 120. The shield has a cylindrical wall 122 extending parallel to the axis of symmetry 236 a sufficient distance such that edge portions 124 of the cylindrical wall 122 are operable to lie in close proximity with the surface of the workpiece being probed (not shown). The position of the probe tip shield on the axial capacitor portion is secured by a set screw 120 so that the probe tip 212 (of FIG. 6) is only exposed by an amount sufficient for the particular probing operation. Other probe tips can be used in a similar manner.

The probe tip shield is effective in reducing external and undesired environmental capacitance from acting on the probe tip. It will however prevent effective radiation of the measurement signal from the probe tip. Consequently, when the probe tip shield is used, the antenna 169 must be used or a direct connection to the receiver must be made using the connector 148.

It will be appreciated that the distance between the receiving antenna and probe tip is highly variable and that the ability to receive the transmitted signal depends on the radiation available in the particular probing application. A distance of approximately 20 feet is possible only when the probe tip is fully exposed, i.e. the case where one is not probing anything. Also, the size/geometry of the probe tip has an effect upon reception since it is functioning as the antenna. In general the bigger the probe tip, the more it is an effective radiator.

The temperature of the oven has been stated to be approximately 60° C. Other temperatures would work, although an ovenized crystal oscillator normally operates at a temperature near a "turn over" point for the particular crystal used, the "turn over" point being a relatively flat (point of inflection) portion of the crystal frequency v.s. temperature curve. AT cut crystals typically have a low turn over point approximately 30° C. making them a good choice for stable operation in non-ovenized room temperature oscillators. Doubly rotated SC cut crystals can be expected to work better in ovenized oscillators because of their higher turn over temperatures of approximately 60°–70° C.

With regard to the size of the probe, the free space probe tip capacitance is generally small making the axial capacitor portion 64 primarily responsible for setting the upper frequency point. It is however not entirely negligible in that the probe frequency will decrease when the probe tip is installed under free space conditions. If the probe tip physical size is increased, then the associated "free space" probe tip capacitance would also increase, making the installation of a larger probe tip an important factor in establishing the upper operating frequency. In the first embodiment, the probe has an overall length of approximately 6 inches and the spherical portion is approximately one-inch in diameter.

The analog display on the receiver is primarily used for manual, human operation of the probe. The communications port 176 however also permits interfacing the receiver to a computerized positioning system which could include a stationary workpiece and movement of the probe as opposed to the milling machine examples described. Thus the system may be used with coordinate measuring machines (CMM) where the probe moves about the fixed workpiece in measuring three-dimensional parts.

It will be appreciated that the modulation effect is also possible to achieve with a stationary probe and a rotating workpiece. This would be the case when centring a workpiece bore in the chuck of a lathe since a lathe usually rotates the workpiece and the tooling (cutters, etc) are stationary. In this case, the workpiece, if not centred, would be oscillating about the centre position of the probing probe tip. This type of operation would normally require a symmetric probe tip.

While specific embodiments of the invention have been described and illustrated, such embodiments should be considered illustrative of the invention only and not as limiting the invention as construed in accordance with the accompanying claims.

What is claimed is:

1. An apparatus for physical proximity measurement, the apparatus including:
   a) a reactance controlled signal source for producing a measurement signal having a measurement signal frequency dependent upon reactance;
   b) a probe tip connected to said signal source, to receive said measurement signal while presenting a measurement reactance to said signal source, said measurement reactance being due to coupling of said probe tip with a workpiece adjacent the probe tip, said measurement reactance varying in accordance with the physical proximity of the probe tip to said workpiece, thereby causing the signal source to vary said measurement signal frequency according to the proximity of the probe tip to the workpiece, said measurement signal frequency being sufficiently high to be radiated by said probe tip, for reception by a remote receiver.

2. An apparatus as claimed in claim 1 wherein said reactance controlled signal source includes a crystal oscillator circuit including:
   a) a crystal having parallel and series resonant frequencies; and
   b) a first reactance cooperating with said measurement reactance, said first reactance causing said oscillator circuit to oscillate at a nominal frequency when said probe tip is far from said workpiece, said oscillator circuit producing said measurement signal having said nominal frequency when said probe tip is far away from said workpiece, said measurement signal being shifted in frequency in a range being between said parallel and series resonant frequencies in response to changes in said measurement reactance.

3. An apparatus as claimed in claim 2 wherein said first reactance includes a nominal capacitance for setting said nominal frequency.

4. An apparatus as claimed in claim 3 wherein said probe tip is connected to said oscillator circuit to present a probe tip capacitance in parallel with said nominal capacitance.

5. An apparatus as claimed in claim 3 further including a probe mounting portion and a probe tip mounting portion disposed symmetrically about a longitudinal probe axis, the probe tip mounting portion including an axial capacitor portion, said axial capacitor portion providing said nominal capacitance.

6. An apparatus as claimed in claim 5 wherein the axial capacitor portion is dimensioned to provide a nominal capacitance sufficient to cause the crystal oscillator circuit to oscillate at approximately the parallel resonant frequency of the crystal.

7. An apparatus as claimed in claim 5 wherein the axial capacitor portion presents minimum transmission line capacitance between the probe tip and the oscillator circuit.

8. An apparatus as claimed in claim 2 wherein the crystal oscillator circuit includes a Colpitts crystal oscillator.

9. An apparatus as claimed in claim 2 wherein said measurement signal has an amplitude of approximately 1.0 volt RMS.

10. An apparatus as claimed in claim 2 wherein the measurement signal is frequency modulated in response to physical proximity of the probe tip to the workpiece and has low occupied signal bandwidth.

11. An apparatus as claimed in claim 2 further including measurement signal output means for providing an output signal corresponding to said measurement signal.

12. An apparatus as claimed in claim 11 wherein said measurement signal output means includes an external antenna connector and a buffer amplifier having an input and an output, the input being operable to receive said measurement signal from said oscillator circuit and the output being operable to provide a buffered version of the measurement signal at said external antenna connector.

13. A method of indicating the physical proximity of a probe tip relative to a workpiece, the method comprising the steps of:

a) producing a measurement signal having a measurement signal frequency dependent upon reactance presented to a reactance controlled signal source said measurement signal frequency being sufficiently high to permit transmission of said measurement signal from said probe tip;

b) receiving said measurement signal at said probe tip while presenting a measurement reactance to said signal source, said measurement reactance being due to coupling of said probe tip with said workpiece, said measurement reactance varying in accordance with the physical proximity of the probe tip to said workpiece, thereby causing the signal source to vary said measurement signal frequency according to the proximity of the probe tip to the workpiece, while radiating said measurement signal from said probe tip, for reception by a remotely located receiver.

\* \* \* \* \*